United States Patent
Stockman et al.

(10) Patent No.: US 11,941,629 B2
(45) Date of Patent: Mar. 26, 2024

(54) ELECTRONIC DEVICE FOR AUTOMATED USER IDENTIFICATION

(71) Applicant: Amazon Technologies, Inc., Seattle, WA (US)

(72) Inventors: Nichole Stockman, Seattle, WA (US); Korwin Jon Smith, Seattle, WA (US); Douglas Andrew Hungarter, Seattle, WA (US); Joshua Adam Cowan, Seattle, WA (US); Jared Corso, Snoqualmie, WA (US); Rajeev Ranjan, Seattle, WA (US); Prithviraj Banerjee, Redmond, WA (US); Matthew Christopher Smith, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 482 days.

(21) Appl. No.: 16/585,328

(22) Filed: Sep. 27, 2019

(65) Prior Publication Data

US 2021/0097547 A1 Apr. 1, 2021

(51) Int. Cl.
*G06Q 20/40* (2012.01)
*G06V 40/13* (2022.01)
*G06V 40/60* (2022.01)

(52) U.S. Cl.
CPC ... *G06Q 20/40145* (2013.01); *G06V 40/1312* (2022.01); *G06V 40/67* (2022.01)

(58) Field of Classification Search
None
See application file for complete search history.

(56) References Cited

U.S. PATENT DOCUMENTS 9,117,106 B2   8/2015   Dedeoglu et al.
9,235,928 B2   1/2016   Medioni et al.
(Continued)

FOREIGN PATENT DOCUMENTS

CN   209015177 U   6/2019
EP   3076334 A1    10/2016
(Continued)

OTHER PUBLICATIONS

PCT Search Report and Written Opinion dated Jan. 12, 2021 for PCT application No. PCT/US20/52729, 15 pages.
(Continued)

*Primary Examiner* — Bruce I Ebersman
*Assistant Examiner* — Matthew Cobb
(74) *Attorney, Agent, or Firm* — Lee & Hayes P.C.

(57) ABSTRACT

This disclosure describes techniques for providing instructions when receiving biometric data associated with a user. For instance, a device may detect a portion of a user, such as a hand. The device may then display a first graphical element indicating a target location for placing the portion of the user above the user-recognition device. Additionally, the device may determine locations of the portion of the user above the device. The device may then display a second graphical element indicating the locations, such as when the locations are not proximate to the target location. Additionally, the device may display instructions for moving the portion of the user to the target location. Based on detecting that the location of the portion of the user is proximate to the target location, the device may send data representing the portion of the user to a remote system.

20 Claims, 21 Drawing Sheets

(56) References Cited

U.S. PATENT DOCUMENTS

| | | | |
|---|---|---|---|
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 2004/0264742 A1* | 12/2004 | Zhang | G06V 40/1347 382/115 |
| 2008/0107309 A1 | 5/2008 | Cerni | |
| 2010/0127069 A1 | 5/2010 | Henton, Sr. | |
| 2011/0274318 A1 | 11/2011 | Shindo | |
| 2012/0013436 A1 | 1/2012 | Niinuma | |
| 2012/0078764 A1* | 3/2012 | Ross | G06Q 30/04 705/35 |
| 2013/0284806 A1 | 10/2013 | Margalit | |
| 2015/0012426 A1* | 1/2015 | Purves | G02B 27/017 705/41 |
| 2015/0252980 A1 | 9/2015 | Maeda | |
| 2016/0232401 A1* | 8/2016 | Hoyos | G06V 40/1382 |
| 2017/0169202 A1 | 6/2017 | Duggan et al. | |
| 2017/0255815 A1 | 9/2017 | Matsunami | |
| 2017/0256073 A1* | 9/2017 | Borenstein | G06T 7/33 |
| 2018/0078282 A1 | 3/2018 | Takemoto | |
| 2018/0144178 A1* | 5/2018 | Han | G06F 21/31 |
| 2018/0157336 A1* | 6/2018 | Harris | G06V 40/28 |
| 2018/0181737 A1* | 6/2018 | Tussy | G06V 40/172 |
| 2019/0018506 A1* | 1/2019 | Bernstein | G06F 3/0487 |
| 2020/0320321 A1 | 10/2020 | Yang et al. | |
| 2021/0201001 A1* | 7/2021 | Hu | G06V 40/16 |
| 2021/0406531 A1 | 12/2021 | Lau et al. | |

FOREIGN PATENT DOCUMENTS

| | | | | |
|---|---|---|---|---|
| ES | 2338092 A1 * | 5/2010 | | G06F 21/00 |
| JP | 2008071158 | 3/2008 | | |
| JP | 2015121904 A | 7/2015 | | |
| JP | 2015106386 | 6/2016 | | |
| WO | WO2013020577 A2 | 2/2013 | | |
| WO | WO2019114814 A1 | 6/2019 | | |
| WO | 2019162957 A1 | 8/2019 | | |

OTHER PUBLICATIONS

International Search Report and Written Opinion for PCT Application No. PCT/US21/39327, dated Oct. 15, 2021.

International Preliminary Report on Patentability for PCT Application No. PCT/US20/52729, dated Apr. 7, 2022.

Office Action for U.S. Appl. No. 17/688,105, dated Oct. 25, 2022, Lau, "Electronic Device for Automated User Identification", 27 pages.

Japanese Office Action dated Sep. 13, 2023 for Japanese Patent Application No. 2022-567905, a foreign counterpart to U.S. Pat. No. 11,270, 102, 17 pages.

United Kingdom Office Action dated Mar. 31, 2023 for United Kingdom patent application No. 2203911.9, a foreign counterpart of U.S. Appl. No. 16/585,328, 2 pages.

Japanese Office Action dated Apr. 14, 2023 for Japanese patent application No. 2022-517779, a foreign counterpart for U.S. Appl. No. 16/585,328, 6 pages.

Office Action for U.S. Appl. 17/688,105, dated May 31, 2023, Lau, "Electronic Device for Automated User Identification", 34 Pages.

Great Britain Office Action dated Oct. 26, 2023 for Great Britain Application No. 2203911.9, a foreign counterpart to U.S. Appl. No. 16/585,328, 6 pages.

* cited by examiner

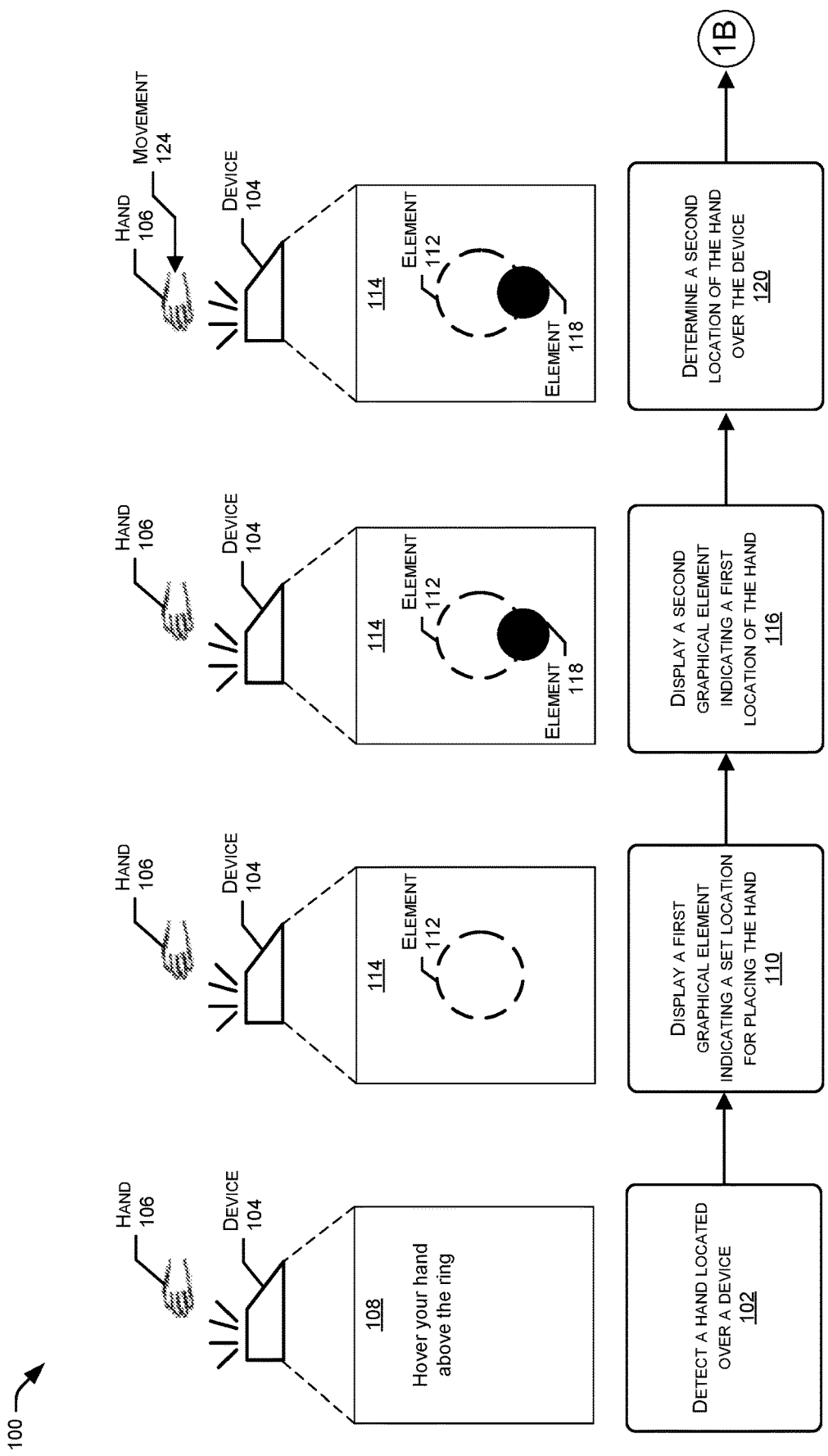

ELECTRONIC DEVICE FOR AUTOMATED USER IDENTIFICATION

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize various types of sensors to allow users to acquire and pay for items without cashiers or dedicated self-checkout stands. In some examples, it may be desirable to identify customers using methods that do not require the use of physical objects and charge the appropriate customer accounts for items taken from the physical stores by the customers.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1A-1B collectively illustrate an example process for providing instructions when capturing biometric data.

DETAILED DESCRIPTION

Figure 1B:
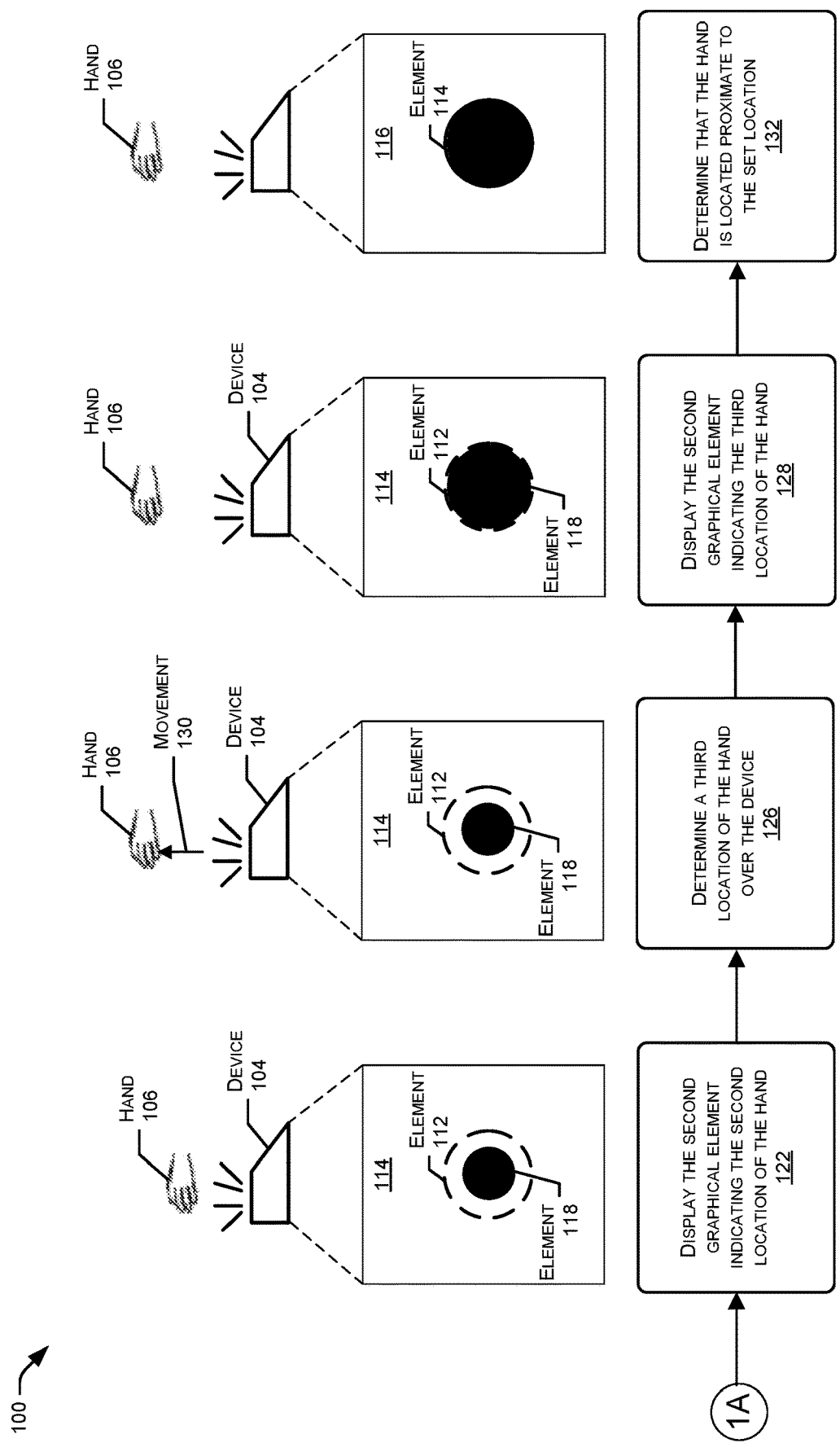

This disclosure describes systems, techniques, and user interfaces for identifying users using biometric-recognition techniques. As described below, users may enroll with a user-recognition system that utilizes various biometric-based recognition techniques so users may be identified without having to carry or use traditional forms of identification, such as showing an ID card or accessing their personal phone. The user-recognition system may recognize, or identify, enrolled users for various purposes, such as for automating traditional checkout experiences in a materials handling facility (or "facility") by charging appropriate user accounts with purchases of items selected by enrolled users in the facility.

In one illustrative example, the systems and techniques are used to recognize or identify users within a materials handling facility, which may include, or have access to, an inventory-management system. The inventory-management system may be configured to maintain information about items, users, conditions of the facility, and so forth. For example, the inventory-management system may maintain data indicative of a result of different events that occur within the facility, such as what items a particular user picks or returns, a location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of the user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the user-recognition system and charging a user account for that user with the cost of the items included in their virtual shopping cart. According to the techniques described herein, a user enrolled with the user-recognition system may need only provide biometric information by, for example, scanning a palm of the user at an imaging device, scanning a fingerprint of the user, looking at a camera of a user-recognition device located in the facility, or the like in order to be identified by the user-recognition system.

To utilize the user-recognition system, a user may request to be enrolled by interacting with a user-recognition device positioned in a facility. For example, the user may select an enroll option on a display of the user-recognition device, issue a voice or GUI-based command requesting to be enrolled, insert a user ID card into the user-recognition device, and/or simply present their hand or palm before the user-recognition device to prompt the enrollment process.

Upon requesting to be enrolled in the user-recognition system, the user-recognition device may, with permission and/or upon explicit request by the user, begin collecting various types of biometric data, and/or other data, for the user. For example, the user-recognition device may include one or more imaging sensors (e.g., a camera) that begins capturing image data (e.g., an individual image, a sequence of images, a video, etc.) of at least a portion of the user, such as a palm of the user, a face of the user, or the like. In the example of the palm, the user-recognition device may request that the user move their hand to different angles and/or orientations as the user-recognition device captures the image data and may also capture image data under different lighting conditions (e.g., no flash, flash, different light polarizations, etc.), to generate image data representing the palm of the user under different environmental conditions.

In some examples, the user may already have an account registered with the inventory-management system to pay for items selected during a shopping session. In such examples, the user-recognition device may determine a user account with which the user is registered in various ways, such as by requesting that the user insert a personal ID card (e.g., driver's license), scan a barcode that may be presented on a display of a phone of the user, login with his or her login credentials, and so forth.

Once the user-recognition device has obtained the image data representing the palm or other potion of the user, the user-recognition device may utilize this data to enroll the user with the user-recognition system. In some examples, the user-recognition system may be implemented entirely on the user-recognition device, which may include the software, firmware, and/or hardware components to implement the techniques described herein. However, in some examples, the user-recognition system may be implemented according to a split architecture where the user-recognition device performs client-side enrollment and identification techniques, and more intensive and/or advanced processing may be performed using a backend, server-based implementation. For example, the user-recognition system may include one or more network-based computing devices positioned at a separate location in the facility, and/or at a remote, cloud-based location. The network-based devices may include various components for implementing the user-recognition system.

In such examples, the user-recognition device may send the image data, and/or feature data generated by the user recognition device using the image data, to the network-based devices to enroll the user for the user-recognition system. The network-based devices of the user-recognition system may perform various processing techniques on the image data and/or feature data such that the user-recognition system is able to identify the user from subsequently received image data and/or feature data.

The user-recognition system may analyze the image data to determine various features of the user. For example, the user-recognition system may extract and/or generate, based on the image data, palm-feature data representing the palm of the user. This palm-feature data may represent information that is potentially unique to the palm of the user, such as the pattern of creases in the user's palm, the pattern of veins of the user's palm, the geometry of one or more portions of the user's hand (e.g., finger sizes/shape, palm size/shape, etc.), and/or the like. The user-recognition system may utilize any type of processing techniques to generate the palm-feature data and may represent the palm of the user depicted in the image data using various types of data structures, such as feature vectors. In some examples, the user-recognition system may include one or more trained models (e.g., machine-learning models) that have been trained to receive image data of a user as input, and output feature vectors representing a palm of the user. Generally, the trained model(s) may comprise any type of models, such as machine-learning models (e.g., artificial neural networks, convolution neural networks (CNNs), classifiers, random-forest models, etc.) that may be trained to identify a palm of a user and/or one or more other portions of the user (e.g., face, etc.).

Upon obtaining the feature data that represents the palm of the user, the user-recognition system may store the feature data in an enrollment database and associate the feature data with a user profile for that specific user. In this way, when subsequent image data is received for a user at a user-recognition device, the feature data stored in the enrollment database may be compared with the feature data generated from the subsequent image data to identify a user profile for the user represented in the subsequent image data and audio data.

In this way, the user may be enrolled for use of the user-recognition system such that, after completing subsequent shopping sessions, the user may checkout by placing his or her palm over an imaging component of a user-recognition device to allow the user-recognition system to automatically recognize the user. The user-recognition device may detect the presence of the user (e.g., detect the palm, detect a face, detect the speech utterance, detect a touch input via a touch display, etc.), and begin streaming image data and audio data to the backend devices of the user-recognition system. The backend devices of the user-recognition system may then utilize the trained model(s) to extract feature data and compare that feature data to stored feature data for user profiles of enrolled users. In addition, or in the alternative, the user may scan his or her palm for recognition upon entering the facility and, in some instances, may simply exit the facility with his or her picked items and without again scanning his or her palm. In these instances, the user may be identified upon entry and located by the system as the user moves about the facility, such that the user may "just walk out" without further interaction with associates or devices at the facility.

As described above, the user-recognition device may request that the user move their hand to different locations, angles, and/or orientations as the user-recognition device captures the image data. In some instances, the user-recognition device may provide one or more user interfaces that help instruct the user to the move the hand to the different locations, angles, and/or orientations. For example, the user-recognition device may display a user interface (referred to as a "first user interface") that includes instructions to place the user's hand over the imaging component of the user-recognition device. The first user interface may further include an interface element that the user may select for creating a new user profile if the user has yet to create a user profile. Additionally, in some instances, the first user interface may include an illustration of how to place the hand over the imaging component. The user-recognition device may display this first user interface when the user first approaches the user-recognition device.

While displaying the first user interface, the user-recognition device may detect the user's hand located over the imaging component. In some examples, the user-recognition device may detect the hand using a distance sensor. In other examples, the user-recognition device may detect the hand using the one or more imaging sensors. In either example, based on detecting the user's hand, the user-recognition device may display a user interface (referred to as a "second user interface") that provides instructions for placing the hand at a target location over the imaging component.

As described herein, the target location over the imaging component may include both a target vertical location (e.g., z-direction) with respect to the imaging component and a target horizontal location (e.g., x-direction and y-direction) with respect to the imaging component. In some examples, the target vertical location may be associated with a vertical distance above the imaging component, such as eight-five millimeters above the imaging component. However, in other examples, the target vertical location may be associated with any other vertical distance above the imaging component. Additionally, in some examples, the target horizontal location may be associated with the middle of the imaging component, both in the x-direction and the y-direction. In some instances, the target vertical location and/or the target horizontal location may also allow for some offset when capturing the biometric data. For example, the target vertical location may allow for the hand to be located between seventy-five millimeters and ninety-five millimeters above the imaging component. Additionally, the target vertical location may allow for the hand to be located with twenty millimeters in either the x-direction or the y-direction.

The second user interface may include a first graphical element that is associated with the target location over the imaging component. In some examples, the first graphical element includes a circle located proximate to the center of the second user interface. The circle may include a solid line, a dashed line, and/or any other type of line. In other examples, the first graphical element may include a different type of shape. For example, the first graphical element may include, but is not limited to, a square, a rectangle, a pentagon, a hexagon, a shape of a hand, and/or any other shape. Additionally, in other examples, the first graphical element may be located at any position on the first user interface.

The second user interface may further include a second graphical element associated with the location of the hand of the user above the imaging component. For example, while the user's hand is located above the imaging component, the user-recognition device may use one or more sensors to detect the location of the user's hand above the imaging component. The location of the user's hand may include a vertical location with respect to the imaging component and a horizontal location with respect to the imaging component. In some examples, the user-recognition device may detect the location of the user's hand at set time intervals. For instance, the user-recognition device may detect the location of the user's hand every millisecond, second, and/or the like. In some examples, such as when the user-recognition device is using the one or more imaging sensors to detect the location, the user-recognition device may detect the location of the user's hand using each frame represented by the image data, every other frame represented by the image data, every fifth frame represented by the image data, and/or the like.

The user-recognition device may then update the second graphical element based on the detected locations of the user's hand. For example, the user-recognition device may update the size of the second graphical element based on the vertical locations of the user's hand. For instance, if the vertical location of the user's hand is proximate to the target vertical location for the imaging component (e.g., eight-five millimeters above the imaging component), the user-recognition device may cause the size of the second graphical element to match the size the first graphical element. However, if the vertical location of the user's hand is further from the imaging component than the set the vertical location (e.g., one hundred millimeters above the imaging component), the user-recognition device may cause the second graphical element to be larger than the size of the first graphical element. This may inform the user to lower the hand closer to the imaging component. Still, if the vertical location of the user's hand is closer to the imaging component than the target vertical location (e.g., fifty millimeters above the imaging component), the user-recognition device may cause the second graphical element to be smaller than the first graphical element. This may inform the user that to raise the hand further above the imaging component.

The user-recognition device may also update the position of the second graphical element based on the horizontal locations of the user's hand. For instance, if the horizontal location of the user's hand is proximate to the target horizontal location for the imaging component (e.g., near the middle of the imaging component), the user-recognition device may cause the second graphical element to be centered within the first graphical element. However, if the horizontal location of the user's hand is to the left or right of the set of horizontal location for the imaging component (e.g., offset in the x-direction), the user-recognition device may cause the second graphical element to be offset from the center of the first graphical element in the left or right direction. This may inform the user to move the user's hand to the left or right with respect to the imaging component. Still, if the horizontal location of the user's hand is to the front or back of the target horizontal location for the imaging component (e.g., offset in the y-direction), the user-recognition device may cause the second graphical element to be offset from the center of the first graphical element in the up or down direction. This may inform the user to move the user's hand to the front or the back direction with respect to the imaging component. While these are just a couple of examples of updating the second graphical element based on the locations of the user's hand, in other examples, the user-recognition device may update the second graphical element using additional and/or alternative techniques.

In some instances, the second user interface may further include instructions for placing the hand at the target location. For a first example, if the horizontal location of the user's hand is to the left of the target horizontal location for the imaging component, the second user interface may include an instruction indicating that the user needs to move the hand to the "RIGHT". For a second example, if the horizontal location of the user's hand is to the right of the target horizontal location for the imaging component, the second user interface may include an instruction indicating that the user needs to move the hand to the "LEFT". For a third example, if the horizontal location of the user's hand is to the front of the target horizontal location for the imaging component, the second user interface may include an instruction indicating that the user needs to move the hand "BACK". For a fourth example, if the horizontal location of the user's hand is to the back of the target horizontal location for the imaging component, the second user interface may include an instruction indicating that the user needs to move the hand "FORWARD".

For a fifth example, if the vertical location of the user's hand is closer to the imaging component than the target vertical location, the second user interface may include an instruction indicating that the user needs to move the hand "HIGHER". Still, for a sixth example, if the vertical location of the user's hand is further from the imaging component than the target vertical location, the second user interface may include an instruction indicating that the user needs to move the hand "LOWER". While these are just a couple of example instructions that the second user interface may provide to the user, in other examples, the second user interface may provide additional and/or alternative instructions to help direct the user where to place the hand.

In some instances, the user-recognition device may update the second graphical element using one or more additional and/or alternative techniques. For example, the user-recognition device may update the size, shape, position, and/or color of the second graphical element based on the location of the hand (e.g., the vertical location or the horizontal location), the pose of the hand, the orientation of the hand, the tilt of the hand, and/or the like. Additionally, the second user interface may provide instructions indicating that the user needs to change the pose of the hand, the orientation of the hand, and/or the tilt of the hand. These instructions may further help the user determine the correct location, position, orientation, and/or tilt for placing the hand over the user-recognition device.

The user-recognition device may continue to provide the instructions to the user until the user-recognition device detects that the hand of the user is proximate to the target location. In some examples, the user-recognition device may detect the hand is proximate to the target location based on determining that the vertical location of the hand is within (e.g., less than) a threshold distance to the target vertical location and the horizontal location of the hand is within a threshold distance to the target horizontal location. As described herein, a threshold distance may include, but is not limited to, ten millimeters, twenty millimeters, thirty millimeters, and/or any other distance.

In some instances, after the user-recognition device detects that the user's hand is located proximate to the target location, the user-recognition device may display a user interface (referred to as a "third user interface") that indicates that the hand is at the correct location. Additionally, in instances where the user has already enrolled with the user-recognition system, the user-recognition system may perform the processes described herein to identify the user profile associated with the user. In instances where the user has yet to enroll with the user-recognition system, the user-recognition device may provide one or more additional user interfaces for receiving additional information for enrolling with the user-recognition system.

For a first example, the user-recognition device may display a user interface (referred to as a "fourth user interface") for inputting information associated with the user. The information may include, but is not limited to, an identifier of the user (e.g., name, username, etc.), an identifier for an account associated with an online marketplace, a phone number associated with the user, an email address associated with the user, and/or any other information. For a second example, the user-recognition device may display a user interface (referred to as a "fifth user interface") that instructs the user to insert a payment instrument into a reader of the user-recognition device. For instance, the fifth user interface may instruct the user to insert a debit or credit card into a card reader of the user-recognition device. In some instances, after inserting the payment instrument into the reader, the fifth user interface may display an indication that the payment information from the payment instrument has been received.

As discussed above, the user-recognition device may use one or more sensors to determine the locations of the user's hand relative to the imaging component. In some examples, the user-recognition device may determine the vertical location of the user's hand using one or more distance sensors. The one or more distance sensors may include, but are not limited to, infrared sensor(s) (IR sensor(s)), LIDAR sensor(s), and/or any other type of sensors that may detect a distance of the user's hand relative to the imaging component. For instance, the one or more distance sensors may be located within and/or proximate to the imaging component and positioned such that the one or more distance sensors are directed upwards in the vertical direction (e.g., in the z-direction). In some examples, the user-recognition device may determine the vertical location of the user's hand using one or more additional and/or alternative types of sensors.

The user-recognition device may determine the horizontal location of the user's hand using the one or more imaging sensors. For example, as described above, the user-recognition device may use the one or more trained models to generate feature data using the image data depicting the user's hand. The feature data may indicate at least attributes associated with the hand, such as, but not limited to, various location(s) on the palm, a location of the center of the palm, location(s) on the fingers (e.g., the start of the fingers, the knuckle locations on the fingers, intersections between the fingers, etc.), location(s) on the thumb, a direction of the hand, a pose of the hand, an orientation of the hand, and/or any other attributes associated with the hand. Using the feature data, the user-recognition device may determine the horizontal location of the user's hand. For example, the user-recognition device may use the center of the palm to determine the horizontal location of the user's hand with respect to the imaging component.

In some instances, before accepting image data representing the hand and/or before determining the horizontal location of the hand with respect to the imaging component, the user-recognition device may perform one or more addition checks using the feature data generated by the one or more trained models. For a first example, the user-recognition device may determine that the object being detected by the one or more imaging sensors is an actual hand and/or that the hand is located within the field of view of the one or more imaging sensors. For instance, the one or more trained models may output data indicating that the hand is located within the field of view of the one or more imaging sensors, the object is hand, the object is not a hand, or that the hand is not located within the field of view of the one or more imaging sensors.

For a second example, the user-recognition device may determine that a degree of angle of the hand is within a threshold degree with respect to the imaging component. The user-recognition device may determine the degree of angle of the hand using the attributes, such as the locations of the one or more points on the hand. The threshold degree may include, but is not limited to, 2 degrees, 5 degrees, 10 degrees, and/or any other angle. For a third example, the user-recognition device may determine that the pose of the hand is acceptable. In some instances, the user-recognition device determines that the pose is acceptable when the hand includes a planar shape that positioned along of plane of the imaging component. Additionally, the user-recognition device may determine that the pose of the hand is not acceptable when the hand is positioned in a cup, a fist, and/or the hand is making a gesture.

For a fourth example, the user-recognition device may determine that a tilt of the hand is within a threshold tilt. In some instances, the user-recognition device may determine that the tilt of the hand is within the threshold tilt when the hand is parallel to the plane of the imaging component and/or within the threshold angle to being parallel with the plane of the imaging component. Additionally, the user-recognition device may determine that the tilt of the hand is not within the threshold tilt when the hand is not within the threshold angle to being parallel with the plane of the imaging component. Still, for a fifth example, the user-recognition device may determine whether the hand includes a right hand or a left hand.

In some examples, when performing the one or more additional checks, the user-recognition device may determine that additional image data needs to be captured and analyzed when at least one of the checks fails. For example, if the user-recognition device determines that the pose of the hand includes a fist, then the user-recognition device may determine to generate additional image data for analysis in order to determine the horizontal location of the hand. For another example, if the user-recognition device determines that the degree of angle of the hand exceeds the threshold angle, then the user-recognition device may determine to generate additional image data for analysis in order to determine the horizontal location of the hand.

In some instances, the user-recognition system may store, for an individual user, multiple pieces of image data or palm-feature data corresponding to image data captured at different points in time. For instance, when a specific user first enrolls with the user-recognition system, the system may store, in association with the account of the user, at least one of the image data of the user's palm and/or palm-feature data generated based on the image data. Therefore, when the user returns to a facility that utilizes the user-recognition system for identification and provides image data of the palm of the user, the palm-feature data generated using this new image data may be compared to the stored palm-feature data to determine when the user at the facility corresponds to the user associated with the profile. It is to be appreciated that this new palm-feature data may be compared to palm-feature data associated with multiple different user profiles for identifying the user.

Although the techniques described herein are primarily with reference to identifying users for the purpose of identifying a user account to charge for items selected from a materials handling facility, the techniques are equally applicable to any industry in which user recognition may be helpful. For instance, the user-recognition system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations.

Additionally, although the techniques described above include the user-recognition device determining the locations of the hand, in other examples, the backend devices may determine the locations of the hand. For example, the user-recognition device may send the sensor data generated using the one or more sensors to the backend devices. The backend devices may then perform the processes described herein, with respect to the user-recognition device, to determine the locations of the hand. Additionally, the backend devices may send, to the user-recognition device, data indicating the locations of the hand. The user-recognition device may then use the data to update the user interfaces when providing the instructions to the user.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1B collectively illustrate an example process 100 for providing instructions when capturing biometric data. At 102, a user-recognition device 104 may detect a hand 106 located over a device. For instance, the user-recognition device 104 may display a first user interface 108 that includes instructions to place the hand 106 over the user-recognition device 104. In the example of FIGS. 1A-1B, the instructions indicate that the user should hover the hand above a portion (e.g., the ring) of the user-recognition device 104. However, in other examples, the instructions may include any other instructions that indicate to the user to place the hand 106 over the user-recognition device 104. The user-recognition device 104 may then use one or more sensors to detect the hand 106. For example, the user-recognition device 104 may use a distance sensor to detect the hand 106 located over the user-recognition device 104. For another example, the user-recognition device 104 may use one or more imaging sensors to generate image data representing the hand 106. The user-recognition device 104 may then analyze the image data to determine that the hand 106 is located over the user-recognition device 104.

At 110, the user-recognition device 104 may display a first graphical element 112 indicating a target location for placing the hand 106. For instance, based on detecting the hand 106, the user-recognition device 104 may display a second user interface 114 that includes the first graphical element 112. The first graphical element 112 may be associated with the target location for placing the hand 106 over the user-recognition device 104. In some instances, the target location may be associated with a target vertical location and a target horizontal location over the user-recognition device 104.

At 116, the user-recognition device 104 may display a second graphical element 118 indicating a first location of the hand 106. For instance, the user-recognition device 104 may determine the first location of the hand 106 over the user-recognition device 104. In some instances, the user-recognition device 104 determines the first location using the one or more sensors. For example, the user-recognition device 104 may use the one or more imaging sensors to generate image data representing the hand 106. The user-recognition device 104 may then generate features data using the image data, where the feature data represents one or more attributes associated with the hand 106. The one or more attributes may include, but are not limited to, various location(s) on the palm, a location of the center of the palm, location(s) on the fingers (e.g., the start of the fingers, the knuckle locations on the fingers, locations of intersections between the fingers, etc.), location(s) on the thumb, a direction of the hand 106, a pose of the hand 106, an orientation of the hand 106, and/or any other attributes associated with the hand 106. Using the feature data, the user-recognition device 104 may determine the horizontal location of the user's hand.

Additionally, the user-recognition device 104 may use the distance sensor to determine the vertical location of the hand 106 above the user-recognition device 104. Based at least in part on the horizontal location and the vertical location, the user-recognition device 104 may display the second graphical element 118 on the second user interface 114, where the second graphical element 118 indicates the horizontal location and the vertical location. For instance, and as shown in the example of FIGS. 1A-1B, the second graphical element 118 is located downward from the first graphical element 112 on the second user interface 114. This may indicate that the hand 106 is located further back from the user-recognition device 104 than the target horizontal location. Additionally, the second graphical element 118 is smaller than the first graphical element 112. This may indicate that the hand 106 is located closer to the user-recognition device 104 than the target vertical location.

At 120, the user-recognition device 104 may determine a second location of the hand 106 over the device and at 122, the user-recognition device 104 may display the second graphical element 118 indicating the second location of the hand 106. For instance, the user-recognition device 104 may detect a horizontal movement 124 of the hand 106 over the user-recognition device 104. In some instances, the user-recognition device 104 detects the horizontal movement 124 by generating additional image data using the one or more imaging sensors. The user-recognition device 104 may then generate features data using the additional image data. Using the feature data, the user-recognition device 104 may determine the second location of the hand 106. The user-recognition device 104 may then update the position of the second graphical element 118 on the second user interface 114 to indicate the new horizontal location of the hand 106. As shown, the second graphical element 118 is now centered within the first graphical element 112. This may indicate that the hand 106 is located proximate to the target horizontal location.

At 126, the user-recognition device 104 may determine a third location of the hand 106 over the device and at 128, the user-recognition device 104 may display the second graphical element 118 indicating the third location of the hand 106. For instance, the user-recognition device 104 may detect a vertical movement 130 of the hand 106 over the user-recognition device 104. In some instances, the user-recognition device 104 detects the vertical movement 130 using the distance sensor. The user-recognition device 104 may then update the size of the second graphical element 118 on the second user interface 114 to indicate the new vertical location of the hand 106. As shown, the size of the second graphical element 118 is approximately the size of the first graphical element 112. This may indicate that the hand 106 is located at the target vertical location.

At 132, the user-recognition device 104 may determine that the hand 106 is located proximate to the target location. For instance, the user-recognition device 104 may determine that the horizontal location of the hand 106 is located within a threshold distance to the target horizontal location and that the vertical location of the hand 106 is located within a threshold distance to the target vertical location. As such, the user-recognition device 104 may determine that the hand 106 is located proximate to the target location. In some instances, and as illustrated in the example of FIGS. 1A-1B, the user-recognition device 104 may then update the first graphical element 112 to indicate the hand 106 is located proximate to the target location. For instance, the user-recognition device 104 may update the line of the first graphical element 112 to include a solid line.

FIGS. 2A-2F illustrate examples of the user-recognition device 104 providing instructions for placing a hand at a target location over the user-recognition device 104. As shown, the user-recognition device 104 may display a user interface 202 that includes a first graphical element 204. The first graphical element 204 may indicate the target location for placing the hand over the user-recognition device 104. For instance, the first graphical element 204 may indicate both the target vertical location and the target horizontal location over the user-recognition device 104. In some instances, and as shown in the example of FIGS. 2A-2F, the first graphical element 204 includes a circle with dashed lines. However, in other examples, the first graphical element 204 may include any other shape with any other type of lines.

The user interface 202 further includes a second graphical element 206 indicating the location of the hand over the user-recognition device 104. Additionally, the user-recognition device 104 includes instructions 208 for placing the hand at the target location. For instance, in the example of FIG. 2A, the second graphical element 206 is located below the first graphical element 204. This may be because the horizontal location of the hand is located further back with respect to the imaging component of the user-recognition device 104 than the target horizontal location (e.g., in the negative y-direction). As such, an instruction 208(1) may indicate that the user needs to move the hand "Forward" with respect to the imaging component (e.g., in the positive y-direction).

Figure 2A:
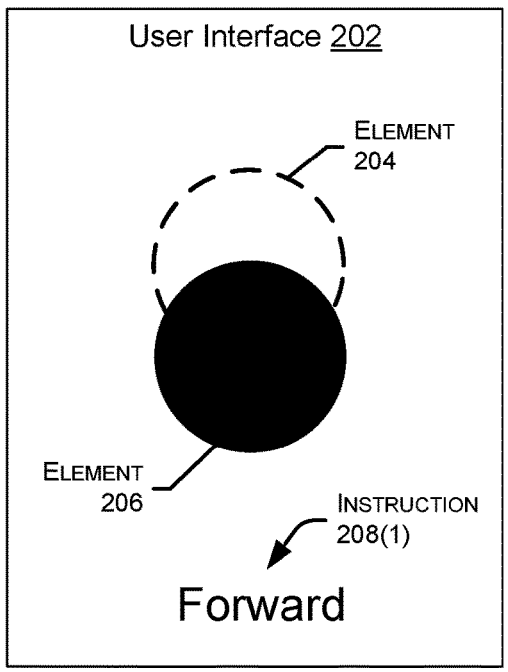
FIGS. 2A-2F illustrate example user interfaces that provide instructions for placing a hand at a target location over a user-recognition device.
Figure 2B:
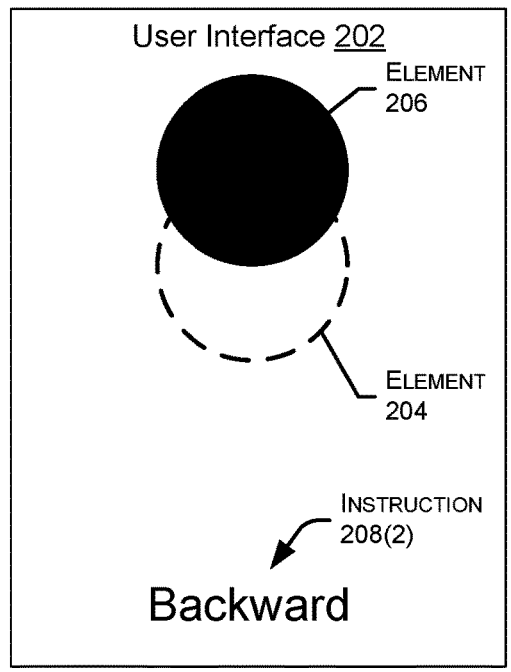

In the example of FIG. 2B, the second graphical element 206 is located above the first graphical element 204. This may be because the horizontal location of the hand is located further forward with respect to the imaging component than the target horizontal location (e.g., in the positive y-direction). As such, an instruction 208(2) may indicate that the user needs to move the hand "Backward" with respect to the imaging component (e.g., in the negative y-direction).

Figure 2C:
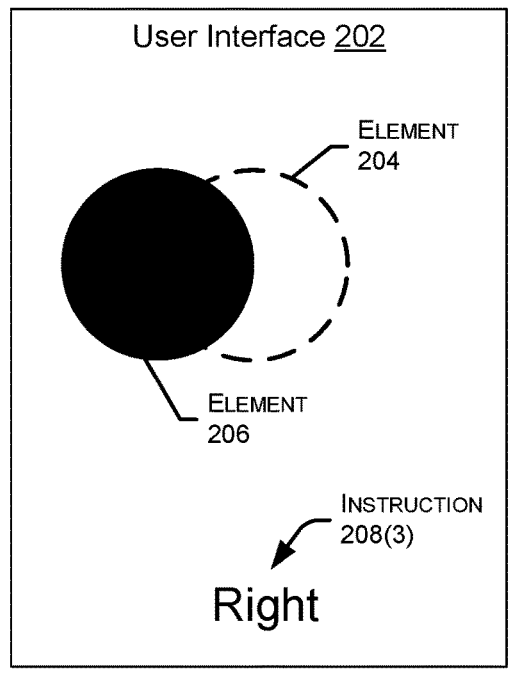

In the example of FIG. 2C, the second graphical element 206 is located to the left of the first graphical element 204. This may be because the horizontal location of the hand is located further to the left with respect to the imaging component than the target horizontal location (e.g., in the negative x-direction). As such, an instruction 208(3) may indicate that the user needs to move the hand to the "Right" with respect to the imaging component (e.g., in the positive x-direction).

Figure 2D:
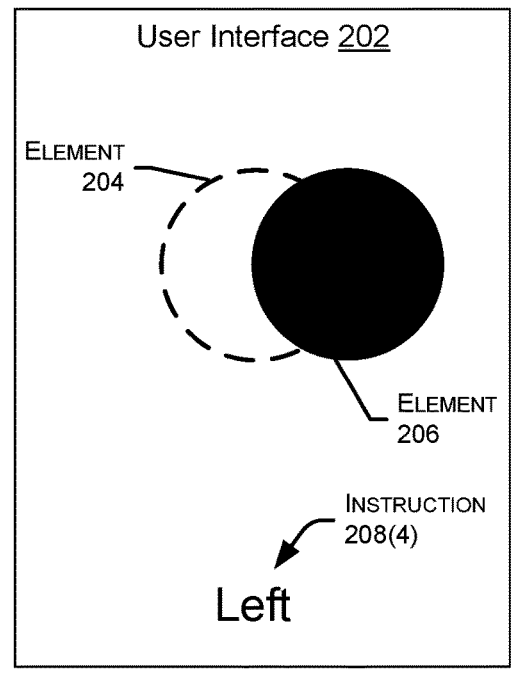

In the example of FIG. 2D, the second graphical element 206 is located to the right of the first graphical element 204. This may be because the horizontal location of the hand is located further to the right with respect to the imaging component than the target horizontal location (e.g., in the positive x-direction). As such, an instruction 208(4) may indicate that the user needs to move the hand to the "Left" with respect to the imaging component (e.g., in the negative x-direction).

Figure 2E:
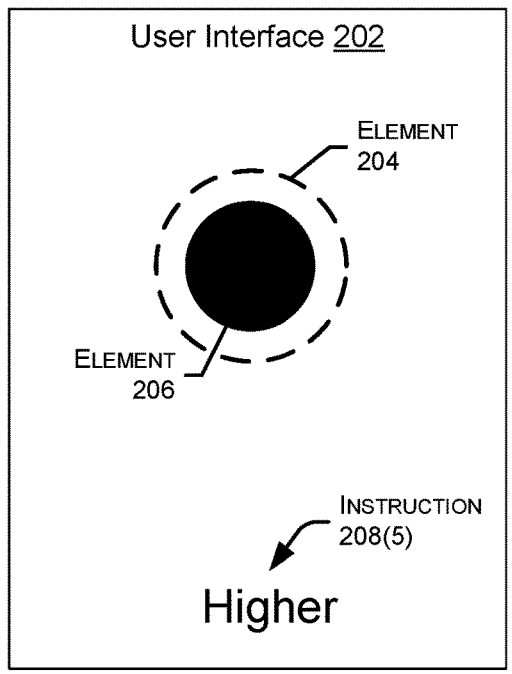

In the example of FIG. 2E, a size of the second graphical element 206 is smaller than a size of the first graphical element 204. This may be because the vertical location of the hand is located closer to the imaging component than the target vertical location (e.g., in the negative z-direction). As such, an instruction 208(5) may indicate that the user needs to move the hand "Higher" with respect to the imaging component (e.g., in the positive z-direction).

Figure 2F:
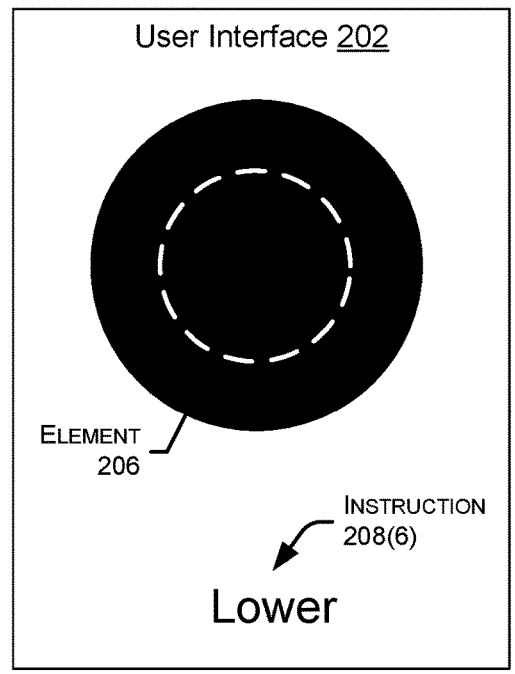

In the example of FIG. 2F, a size of the second graphical element 206 is larger than a size of the first graphical element 204. This may be because the vertical location of the hand is located further from the imaging component than the target vertical location (e.g., in the positive z-direction). As such, an instruction 208(6) may indicate that the user needs to move the hand "Lower" with respect to the imaging component (e.g., in the negative z-direction).

Figure 3A:
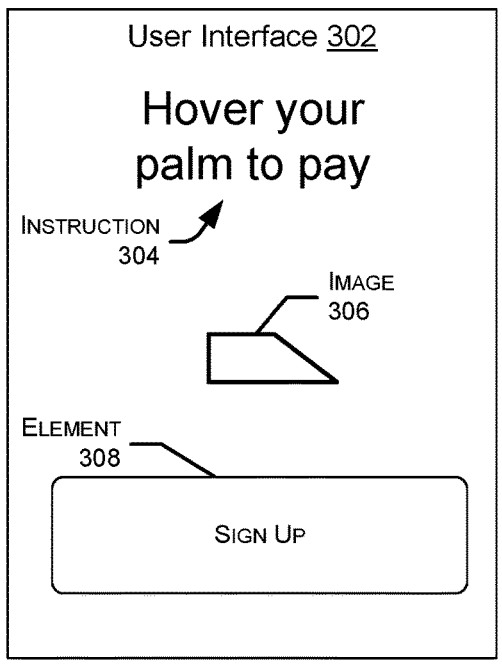
FIGS. 3A-3F illustrate examples user interfaces that provide instructions for inputting additional information when capturing biometric data.

FIGS. 3A-3F illustrate examples user interfaces providing instructions for inputting additional information when capturing biometric data. For instance, and as illustrated in the example of FIG. 3A, the user-recognition device 104 may provide a user interface 302 that includes an instruction 304 associated with hovering the palm of the hand over the user-recognition device 104 to pay for a transaction. The user interface 302 further includes an image 306 of the user-recognition device 104 and a graphical element 308 that the user can select to sign up for a new account. In some instances, the user-recognition device 104 may be displaying the user interface 302 when the user initially approaches the user-recognition device 104.

Figure 3B:
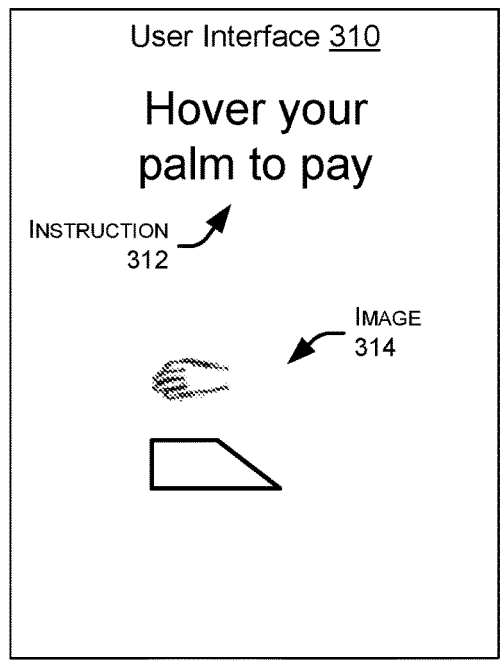

In the example of FIG. 3B, the user-recognition device 104 may provide a user interface 310 that includes an instruction 312 associated with hovering the palm of the user over the user-recognition device 104 to pay for a transaction. Additionally, the user interface 310 includes an image 314 of a user placing a palm over the user-recognition device 104. In other words, the image 314 provides a representation of how the user should place the palm over the user-recognition device 104. In some instances, the user-recognition device 104 may display the user interface 310 right before detecting the palm of the user.

Figure 3C:
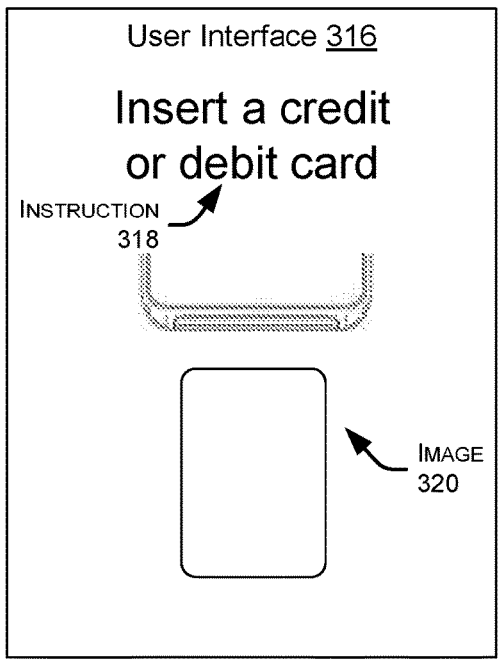

In the example of FIG. 3C, the user-recognition device 104 may provide a user interface 316 that includes an instruction 318 to insert a debit or credit card into the user-recognition device 104. The user interface 316 further includes an image 320 of how to insert the debit or credit card into the card reader of the user-recognition device 104. In some instances, the user-recognition device 104 may display the user interface 316 when the user is creating a new account and/or updating payment information for an existing account.

Figure 3D:
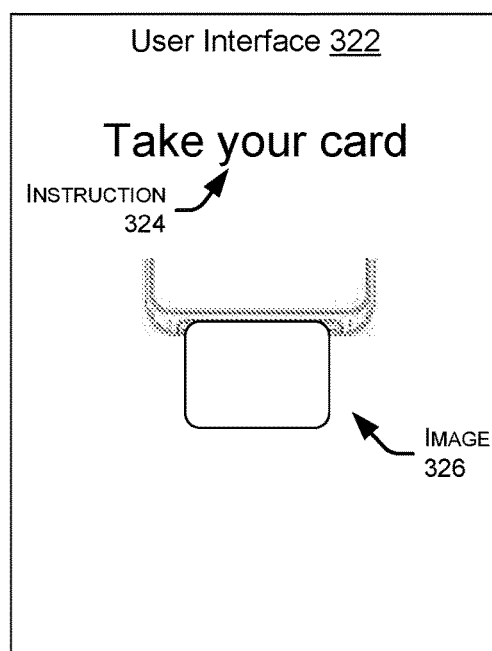

In the example of FIG. 3D, the user-recognition device 104 may provide a user interface 322 that includes an instruction 324 to take the debit or credit card. The user interface 322 also includes an image 326 illustrating that the debit or credit card is still in the card reader of the user-recognition device 104. In some instances, the user-recognition device 104 displays the user interface 322 after the user-recognition device 104 reads the payment information from the debit or credit card and the debit or credit card is still inserted in the card reader.

Figure 3E:
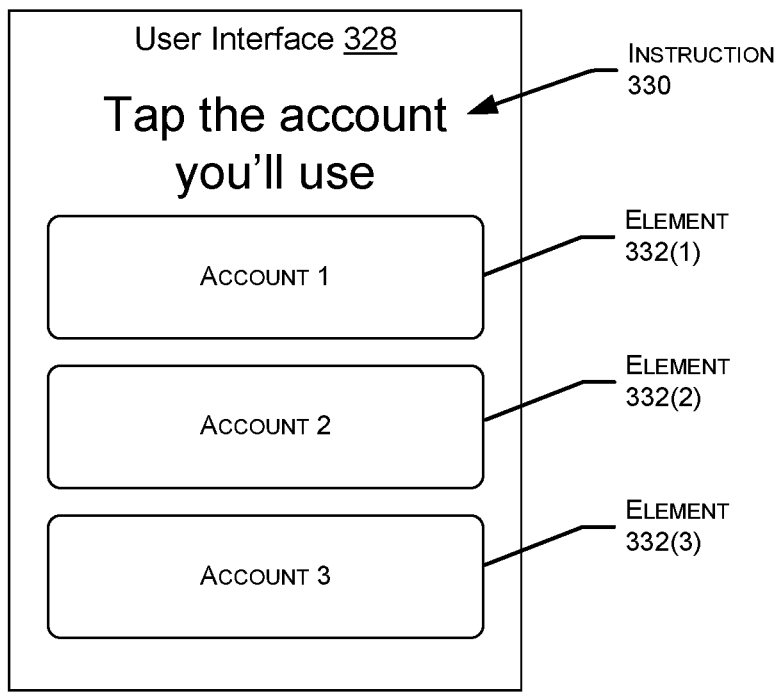

In the example of FIG. 3E, the user-recognition device 104 may provide a user interface 328 that includes an instruction 330 to select an account. The user interface 328 further includes graphical elements 332(1)-(3) that are selectable by the user, where each graphical element 332 (1)-(3) is associated with a possible account of the user. In some instances, each graphical element 332(1)-(3) may include information associated with an account. The information may include, but is not limited to, a phone number, an email address, a username, and/or any other type of information. Although the example of FIG. 3E includes three graphical elements 332(1)-(3), in other examples, the user interface 328 may include any number of graphical elements.

Figure 3F:
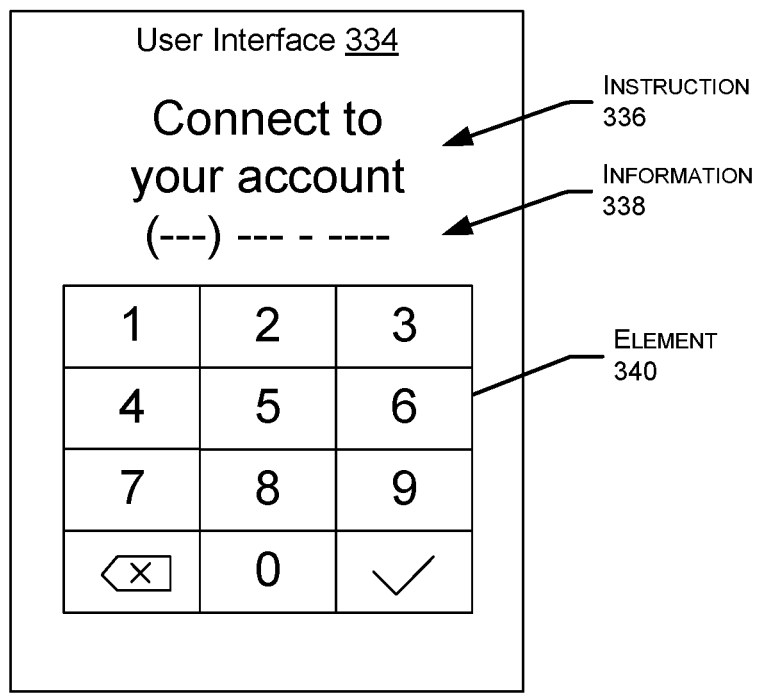

In the example of FIG. 3F, the user-recognition device 104 may provide a user interface 334 that includes an instruction 336 to input information associated with an account. Although the example of FIG. 3F is for inputting a phone number, in other examples, the user interface 334 may allow for inputting additional and/or alternative types of information. As shown, the user interface 334 displays the information 338 as it is being input into the user-recognition device 104. The user interface 334 further includes a graphical element 340 that the user may use to input the information.

Figure 4A:
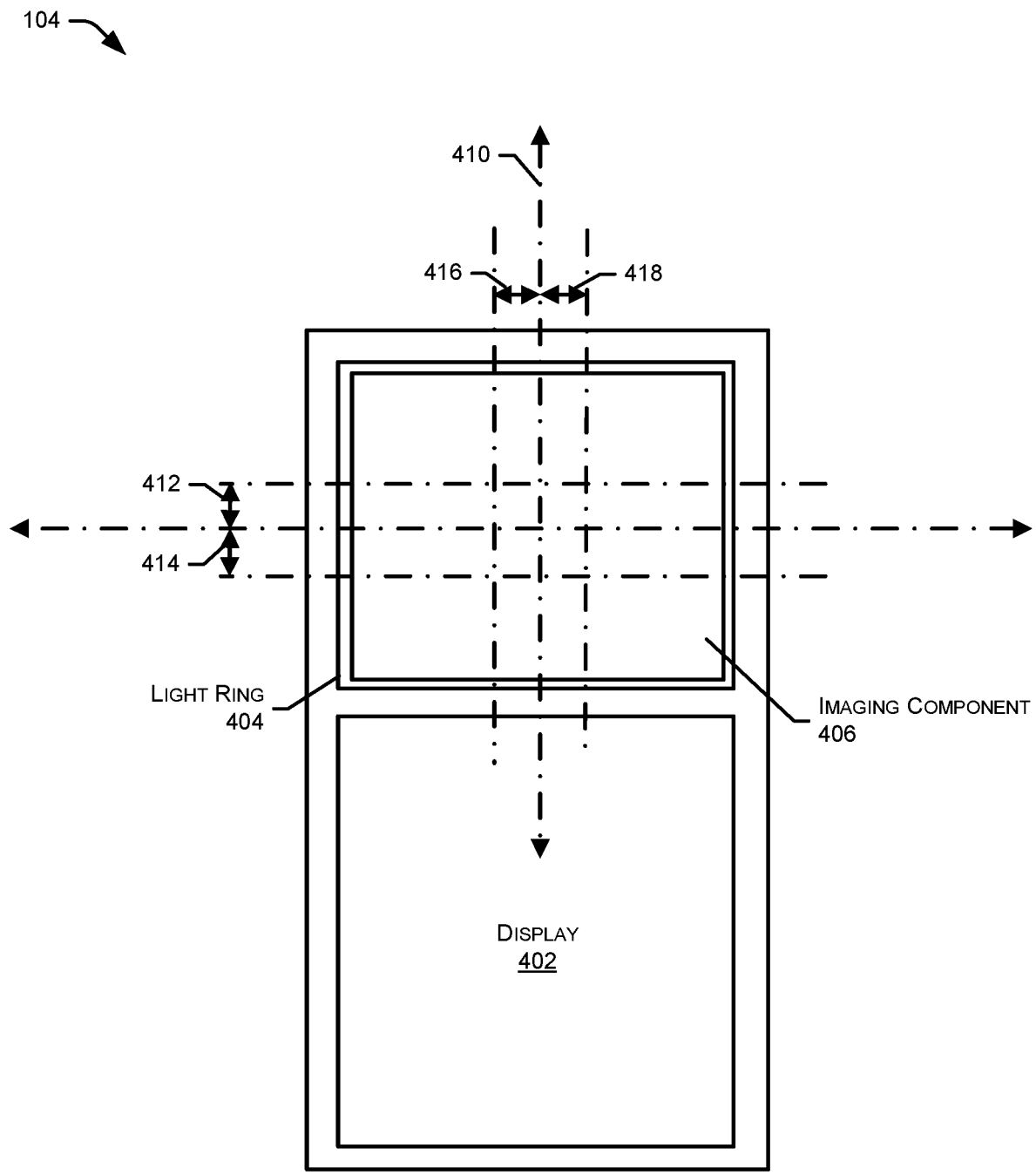
FIGS. 4A-4D illustrate examples of target locations for placing a portion of a user so that a user-recognition device can capture biometric data.
Figure 4B:
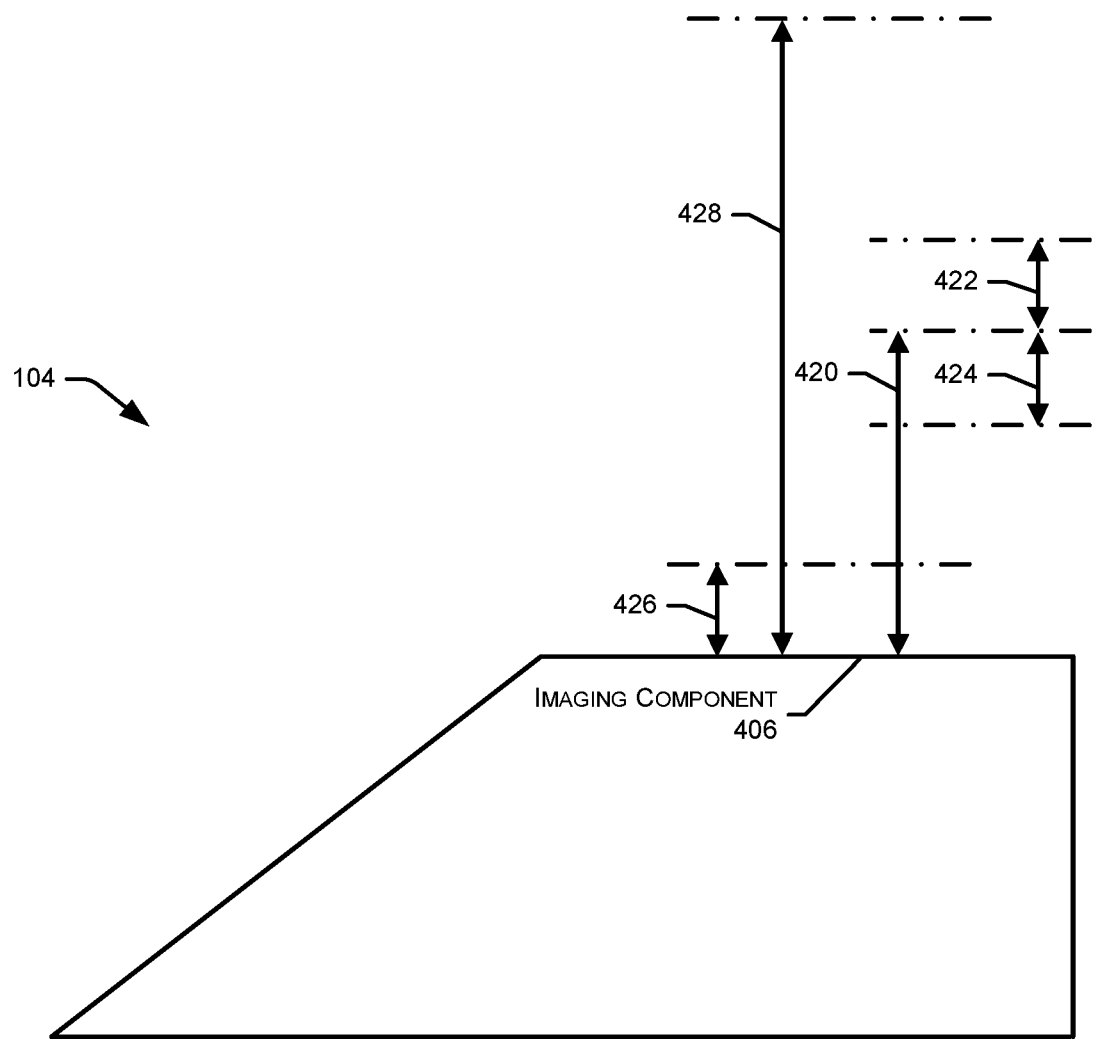

FIGS. 4A-4B illustrate examples of target locations for placing a hand so that a user-recognition device can capture biometric data. For instance, and as shown in the example of FIG. 4A, the user-recognition device 104 includes a display 402 (which may display the user interfaces described herein), a light ring 404, and an imaging component 406. In order for the user-recognition device 104 to capture the biometric data, such as the image data, the user places the hand (e.g., the center point of the palm of the hand) over the imaging component 406 at the target horizontal location. The target horizontal location may be associated with both an x-direction and a y-direction. For instance, the target horizontal location may include the center of the imaging component 406, which is illustrated by the intersection of a first line 408 in the x-direction and a second line 410 in the y-direction.

In some instances, the user-recognition device 104 may allow for the hand to be proximate to the target horizontal location when capturing the biometric data. For instance, the user-recognition device 104 may allow for the hand to be a first threshold distance 412 in front of the target horizontal location (e.g., moving in the positive y-direction from the target horizontal location), a second threshold distance 414 behind the target horizontal location (e.g., moving in the negative y-direction from the target horizontal location), a third threshold distance 416 to the left of the target horizontal location (e.g., moving in the negative x-direction from the target horizontal location), and/or a fourth threshold distance 418 to the right of the target horizontal location (e.g., moving in the positive x-direction from the target horizontal location). In some instances, the first threshold distance 412, the second threshold distance 414, the third threshold distance 416, and the fourth threshold distance 418 may include the same threshold distance. In some instances, one or more of the first threshold distance 412, the second threshold distance 414, the third threshold distance 416, and the fourth threshold distance 418 may include a different threshold distance. As described herein, a threshold distance may include, but is not limited to, five millimeters, ten millimeters, twenty millimeters, and/or any other distance.

Additionally, and as shown in the example of FIG. 4B, the user-recognition device 104 may include a target vertical location that is located a distance 420 above the imaging component 406 (e.g., in the z-direction). In some examples, the distance 420 includes eighty-five millimeters. However, in other examples, the distance 420 may include any other distance. In some instances, the user-recognition device 104 may allow for the hand to be proximate to the target vertical location. For instance, the user-recognition device 104 may allow for the hand to be a first threshold distance 422 above the target vertical location and/or a second threshold distance 424 below the target vertical location. In some instances, the first threshold distance 422 is the same as the second threshold distance 424. In other instances, the first threshold distance 422 is different than the second threshold distance 424.

As further illustrated in the example of FIG. 4B, the user-recognition device 104 may be able to detect the hand of the user between a minimum distance 426 above the imaging component 406 and a maximum distance 428 above the imaging component 406. For instance, the distance sensor may be configured to detect objects, such as hands, between the minimum distance 426 and the maximum distance 428. In some instances, the minimum distance 426 may include, but is not limited to, five millimeters, ten millimeters, twenty millimeters, and/or any other distance. Additionally, the maximum distance 428 may include, but is not limited to, one hundred millimeters, one hundred and twenty millimeters, one hundred and fifth millimeters, and/or any other distance.

Figure 4C:
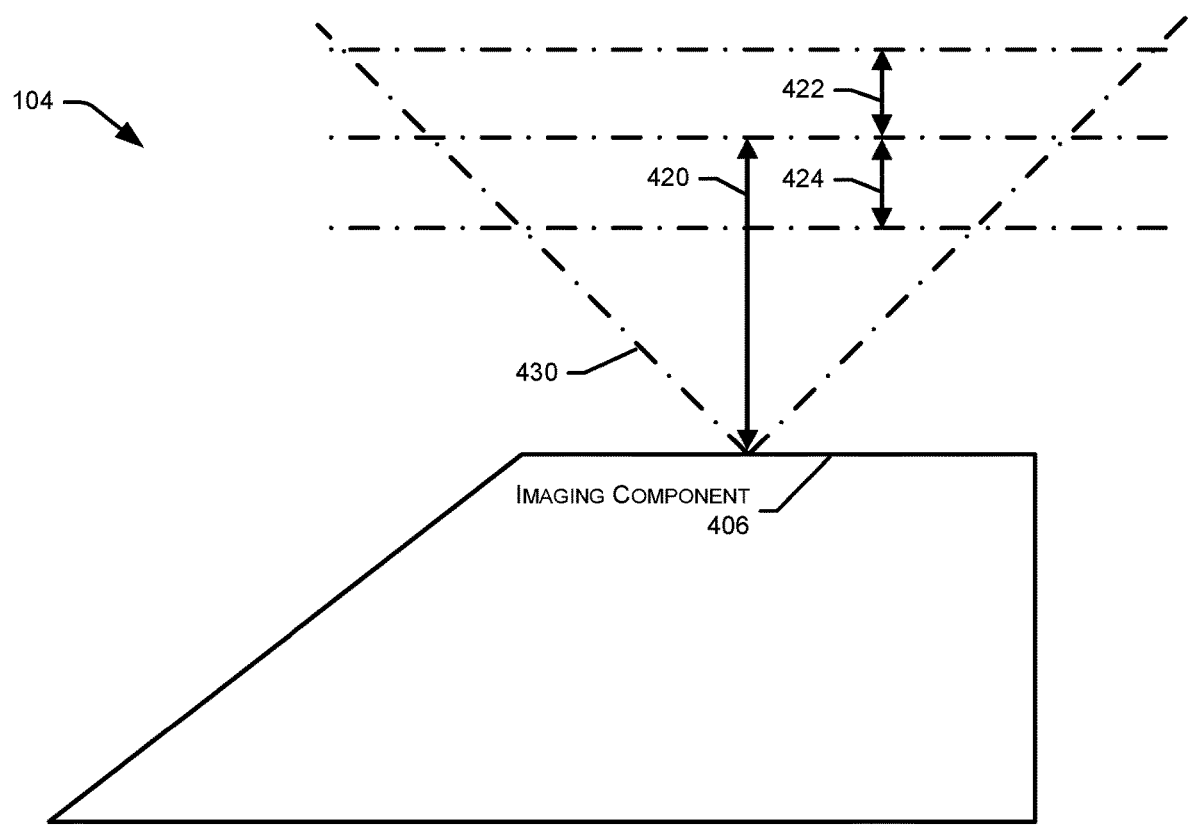
Figure 4C:
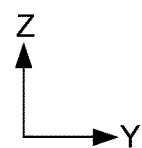

In the example of FIG. 4C, the user-recognition device 104 may include a target location that includes a volumetric shape 430, such as a volumetric shape of a cone above the imaging component 406. For example, the target vertical location may still be located the distance 420 above the imaging component 406 and include the first threshold distance 422 and the second threshold distance 424. The target horizontal location may then be located within the volumetric shape 430 and at locations that are within the target vertical location. In some instances, the palm of the hand may need to be located within the target location while in other examples, the entire hand may need to be located within the target location.

Figure 4D:
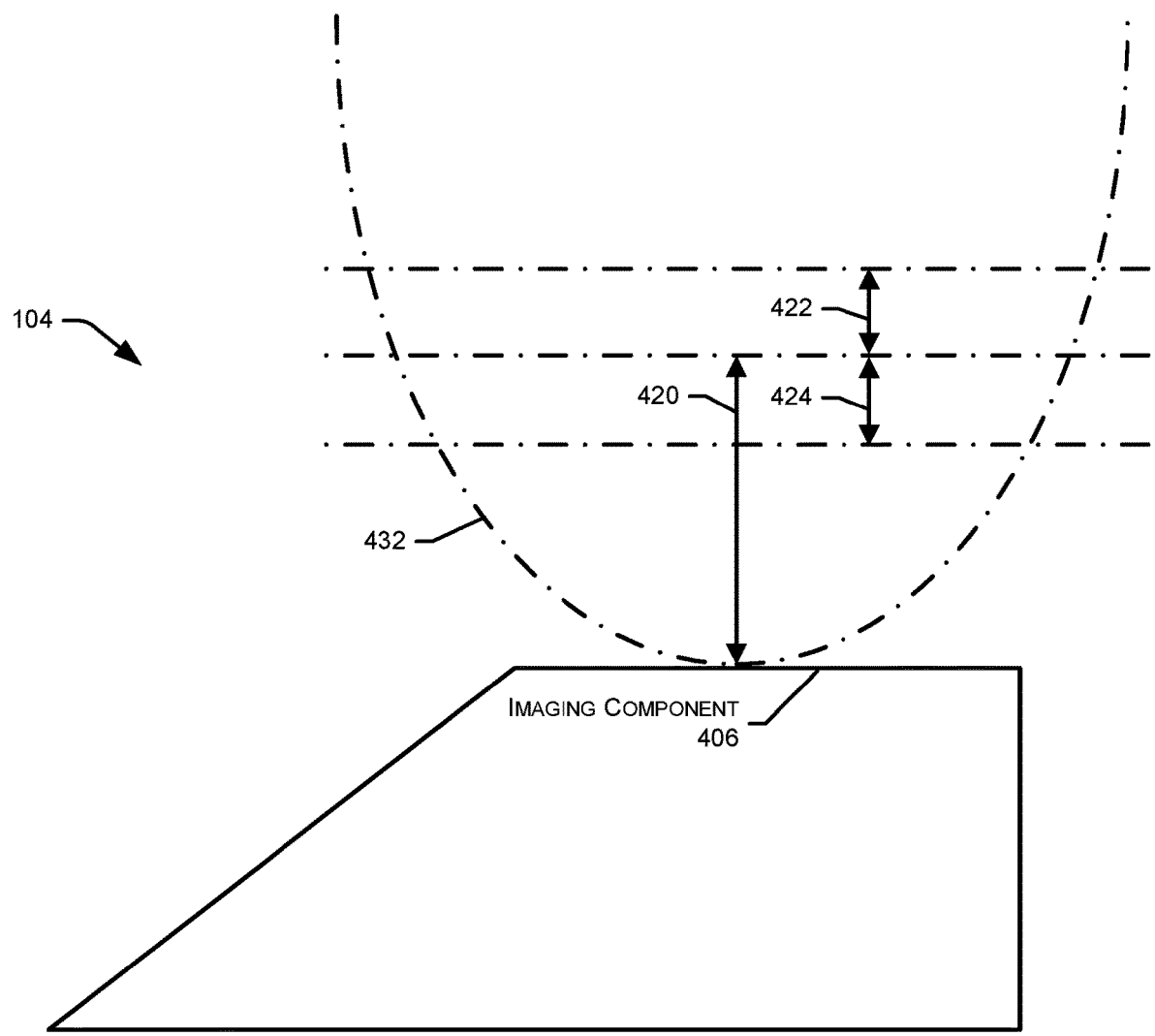

In the example of FIG. 4D, the user-recognition device 104 may include a target location that includes a volumetric shape 432 above the imaging component 406. For example, the target vertical location may still be located the distance 420 above the imaging component 406 and include the first threshold distance 422 and the second threshold distance 424. The target horizontal location may then be located within the volumetric shape 432 and at locations that are within the target vertical location. In some instances, the palm of the hand may need to be located within the target location while in other examples, the entire hand may need to be located within the target location.

Figure 5:
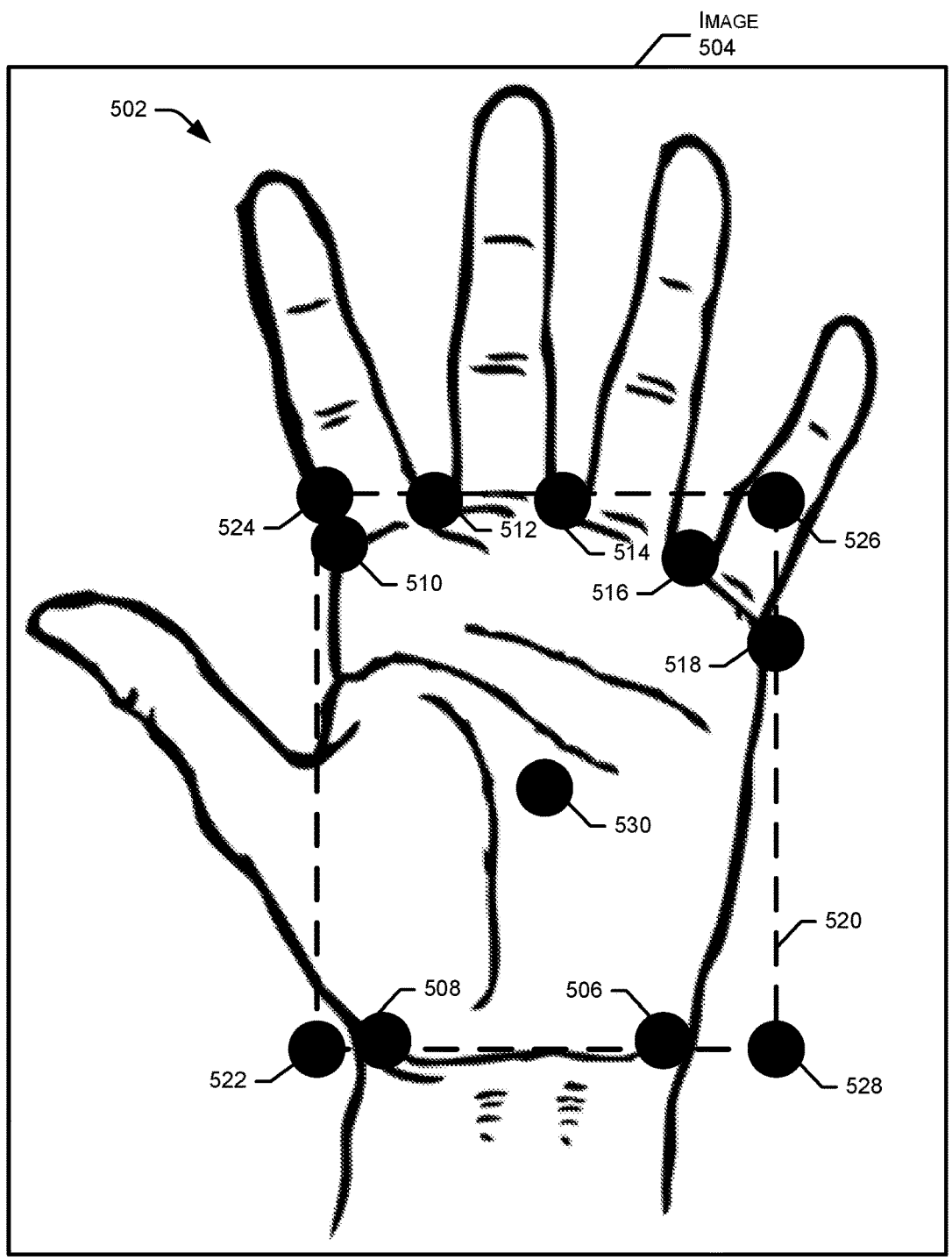
FIG. 5 illustrates an example of analyzing a hand in order to identify the center of a palm of the hand.

FIG. 5 illustrates an example of analyzing a hand 502 in order to identify the center of a palm of the hand 502. For instance, the user-recognition device 104 may generate image data representing an image 504 depicting the hand 502. The user-recognition device 104 may then generate feature data corresponding to the image data, where the feature data represents various attributes associated with the hand 502. The various attributes may include at least points 506-518 located on the hand 502. For example, the user-recognition device 104 may identify a point 506 located on a first end of the wrist and a point 508 located on a second, opposite end of the wrist. The user-recognition device 104 may further identify a point 510-518 located on the bottom of the fingers of the hand 502. As shown, the points 512-518 are located at intersections between the fingers.

After identifying the points 506-518, the user-recognition device 104 may generate a bounding box 520 that includes all of the identified points 506-518. The bounding box 520 may be associated with four additional points 522-528 representing the corners of the bounding box 520. The user-recognition device 104 may then use the bounding box 520 to identify a center point 530 of the palm of the hand 502. For example, the user-recognition device 104 may determine that the center point 530 of the palm includes the center of the bounding box 520. As such, in some examples, the center point 530 of the palm may correspond to the horizontal location of the hand 502.

In some instances, and as described herein, the user-recognition device 104 may identify one or more additional attributes associated with the hand 502 using the image 504. For example, since the hand 502 is oriented in the y-direction, the user-recognition device 104 may determine that the orientation of the hand 502 is satisfied. The user-recognition device 104 may further determine that the planar shape of the hand 502 is satisfied since the hand 502 is not in the shape of a cup, a fist, and/or the hand 502 is making a gesture. Rather, the hand 502 is open such that the user-recognition device 104 may analyze the image 504 to determine the attributes. Furthermore, the user-recognition device 104 may determine that the hand 502 is parallel to the imaging component of the user-recognition device 104. This may be because, based on the orientation of the hand 502 with respect to the imaging component, the palm of the hand 502 is pointed towards the imaging component.

While the example of FIG. 5 describes identifying the points 506-518 and then using the points 506-518 to determine the center point of the palm, in other examples, the user-recognition device 104 may identify additional and/or alternative points on the hand 502 and then use the additional and/or alternative points to identify the center point 530 of the palm.

Figure 6:
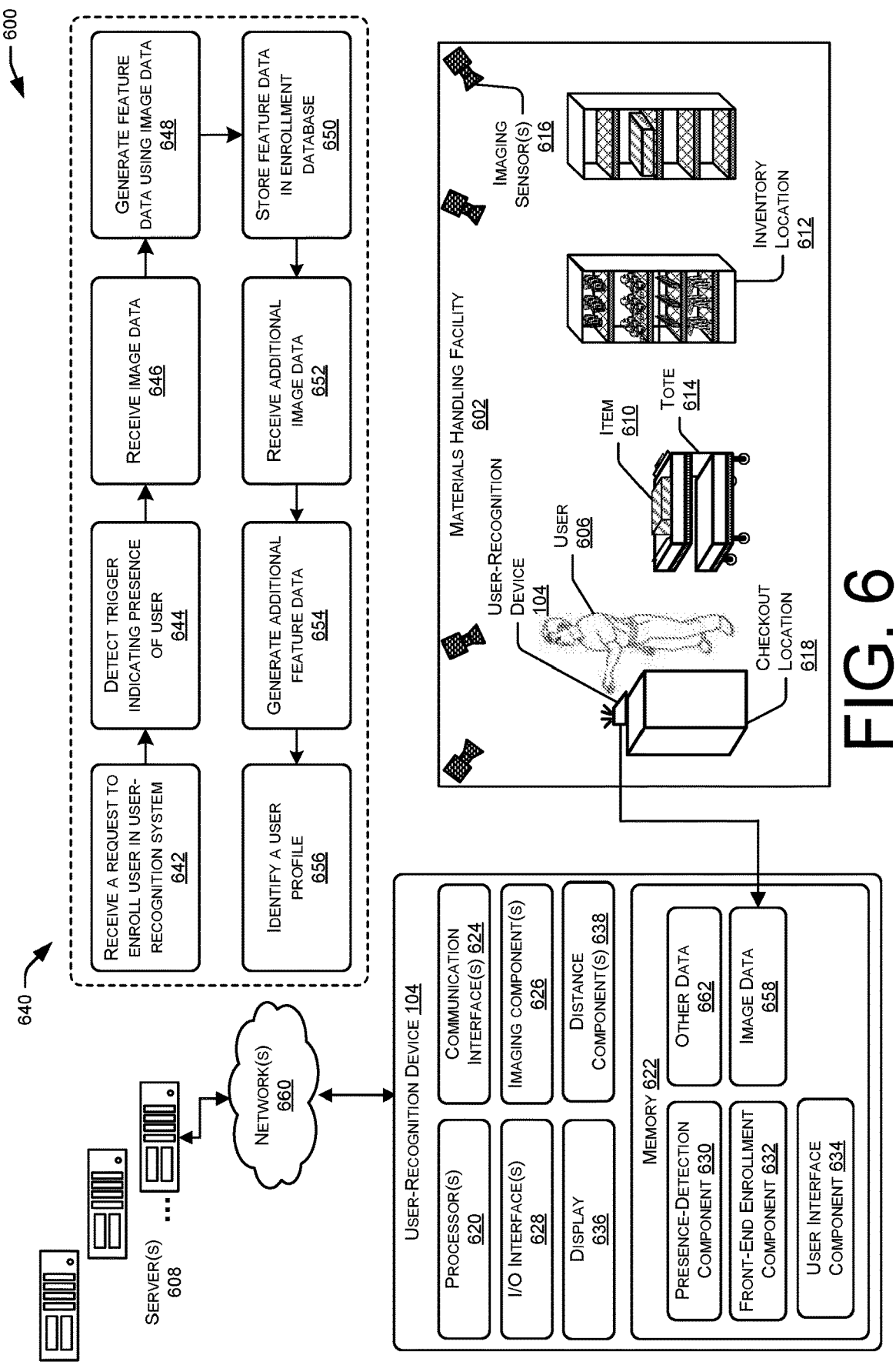
FIG. 6 illustrates an example environment that includes a user-recognition device to determine that a user would like to enroll with a user-recognition system.

FIG. 6 illustrates an example environment 600 of a materials handling facility 602 that includes the user-recognition device 104 to capture biometric data of users. In this example, the user-recognition device 104 generates image data depicting a palm of a user 606 and sends the image data to one or more backend server(s) 608 to be used to enroll the user 606 for use of the user-recognition system. Generally, the user-recognition system may include the user-recognition device 104 and/or the server(s) 608.

In some instances, some or all of the user-recognition system resides remotely from the materials handling facility 602, while in other instances, some or all of the user-recognition system resides within or proximate to the materials handling facility 602. As FIG. 6 depicts, the user 606 may have engaged in, or be about to engage in, a shopping session in the materials handling facility 602. For instance, the user 606 may have selected an item 610 from an inventory location 612 (e.g., shelf, aisle, etc.) and placed the item 610 in a tote 614 (e.g., shopping cart). The inventory location 612 may house one or more different types of items 610 and the user 606 may pick (i.e., take) one of these items 610.

As illustrated, the materials handling facility 602 (or "facility") may include one or more sensors, such as the illustrated imaging sensors 616, and/or an array of other sensors located on or near the inventory location(s) 612. In this example, the imaging sensor(s) 616 are configured to capture video data within the facility 602 for use in determining results associated with events, such as the picking of the item 610 by the user 606. While FIG. 6 illustrates various example sensors, the sensors in the facility 602 may comprise any other type of sensor, such as weight sensors (e.g., load cells), microphones, and/or the like, as described in detail below. As described in more detail with respect to FIGS. 13 and 14, the facility 602 may be monitored and/or otherwise associated with an inventory-management system configured to determine events in the facility 602 associated with the user 606, such as taking items 610 that the user 606 would like to purchase. The inventory-management system may track the items 610 selected by the user 606 and maintain a virtual shopping cart which includes all of the items 610 taken by the user 606. Thus, when a user 606 would like to leave the facility 602 with the items 610 they have taken, the inventory-management system may charge a user account associated with the user 606 for the cost of the items 610 that were taken.

As shown in FIG. 6, the user 606 may approach a checkout location 618 associated with the user-recognition device 104. The user 606 may determine that they would like to enroll for use of a user-recognition system in order to checkout of the facility 602 and pay for their item(s) 610. Alternatively, or additionally, the user may interact with the user-recognition device 104 upon entering the facility 602. In either instance, the user 606 may determine that they would like the user-recognition system to collect data that is usable to identify the user 606. This data may be utilized by the user-recognition system such that, once enrolled, the user 606 need only scan his or her palm to be identified by the user-recognition system in order to charge their user account with the purchase of their item(s) 610.

FIG. 6 illustrates an example enrollment process 640 that describes, at a high level, techniques for enrolling the user 606 for use of the user-recognition system and for the user-recognition system updating the enrollment of the user 606 over time. The user-recognition device 104 may comprise components for performing at least a portion of the techniques of the enrollment process 640, as may the servers. Components of the server(s) 608 are described in further detail below with reference to subsequent figures. For example, the user-recognition device 104 may comprise one or more processors 620 configured to power components of the user-recognition device 104 and may further include memory 622 which stores components that are at least partially executable by the processor(s) 620, as well as other data 662. For example, the memory 622 may include a presence-detection component 630 to detect the presence of a user 606, a front-end enrollment component 632 configured to perform various operations for enrolling the user 606 for use of the user-recognition system, and a user interface component 634 configured to control user interfaces being provided to the user 606 via a display 636.

At 642, the front-end enrollment component 632 may receive a request to enroll the user 606 for use of the user-recognition system. The request may comprise various types of input, such as a selection made via an I/O interface 628 (e.g., touch screen, mouse, keyboard, etc.) of a user interface element presented on the display 636 for starting an enrollment process. Additionally, the front-end enrollment component 632 may detect a speech utterance from the user 606 indicating a request to enroll (e.g., "please enroll me," "I would like to check out," etc.). Another request example may include the user 606 sliding a user ID card into an I/O interface 628, such as a credit card, driver's license, etc. However, any type of input may be detected as a request by the front-end enrollment component 632.

In some examples, at 644 of the enrollment process 640, the presence-detection component 630 may be executable by the processor(s) 620 to detect a trigger indicating presence of the user 606. The trigger detected by the presence-detection component 630 may comprise one or more types of input. For instance, the presence-detection component 630 may include logic to detect, using one or more imaging components 626 and/or one or more distance components 638, a palm of the user 606 over or proximate to the user-recognition device 104. Other examples of triggers detected by the presence-detection component 630 that may indicate the presence of the user 606 may include receiving touch input (or other input, such as a mouse click) via one or more I/O interfaces 628 of the user-recognition device 104. However, any type of input may be detected as a trigger by the presence-detection component 630 at 644. In some examples, the trigger detection at 644 may not be performed, or may be included in or the same as receiving the request to enroll.

After receiving the request to enroll from the user 606, the front-end enrollment component 632 may, at 646, begin generating image data 658 using one or more imaging component(s) 626 (e.g., cameras). For instance, the front-end enrollment component 632 may utilize the imaging component(s) 626 to obtain image data 658, such as an image or picture, a sequence of consecutive images, and/or video data. The image data 658 may represent the palm of the user 606 and may be used to identify creases in the palm, veins in the palm, geometric information regarding the palm and other parts of the hand or the user 606 and/or the like. In some instances, while obtaining the image data 658, the user interface component 634 may cause the user-recognition device 104 to provide instructions for how to place the hand of the user 606. Once the front-end enrollment component 632 has obtained the image data 658 representing the palm or other portion of the user 606, the user-recognition device 104 may send (e.g., upload, stream, etc.) the image data 658 to the server(s) 608 over one or more networks 660 using one or more communication interfaces 624.

The network(s) 660 may include private networks such as an institutional or personal intranet, public networks such as the Internet, or a combination thereof. The network(s) 660 may utilize wired technologies (e.g., wires, fiber optic cable, and so forth), wireless technologies (e.g., radio frequency, infrared, acoustic, optical, and so forth), or other connection technologies. The network(s) 660 is representative of any type of communication network, including one or more of data networks or voice networks. The network(s) 660 may be implemented using wired infrastructure (e.g., copper cable, fiber optic cable, and so forth), a wireless infrastructure (e.g., cellular, microwave, satellite, etc.), or other connection technologies.

The communication interface(s) 624 may include devices configured to couple to personal area networks (PANs), wired and wireless local area networks (LANs), wired and wireless wide area networks (WANs), and so forth. For example, the communication interfaces 624 may include devices compatible with Ethernet, Wi-Fi™, and so forth. In some examples, the communication interface(s) 624 may encode the image data 658 and/or other data 662 (e.g., distance data from a distance sensor) generated by the user-recognition device 104 prior to sending over the network(s) 660 according to the type of protocol or standard being used.

Upon receiving the image data 658, one or more components of the back-end server(s) 608 may generate feature data using the image data 658. This feature data may be in a vector form and may represent characteristics about the user's palm that may be used to differentiate the palm from other user palms. It is to be appreciated that while this enrollment process 640 describes the server(s) 608 generating the feature data, in other instances, the user-recognition device 104 may be configured to generate the feature data and may send the feature data, in addition to or rather than the image data 658, to the servers.

At 650, one or more components of the server(s) 608 store the feature data in an enrollment database in association with a user profile of the user 606. That is, this palm-feature data is stored such that it may be compared to feature data generate from subsequent image data for later identification of the user 606 at the facility 602 or other facilities that are associated with the user-recognition system.

For example, at 652, the imaging components 626 receive additional image data 658 of the palm of the user 606, such as at a time when the user 606 has returned to the facility 602 at a later date. After the server(s) 608 receive the additional image data 658 from the user-recognition device 104, the servers may generate additional feature data based on the additional image data. At this point, one or more components of the server(s) 608 may compare the additional feature data to feature data stored in respective user profiles for the purpose of identifying the user 606 associated with the additional image data 658. In this example, the user-recognition system compares the additional feature data generated at 654 with the feature data generated at 648 and stored in association with the user profile of the user 606 and, thus, at 656, determines that identifies the user profile. In some instances, in addition to identifying the user profile, the user-recognition system may then store the additional feature data in the enrollment database in association with the user profile of the user 606.

Figure 7:
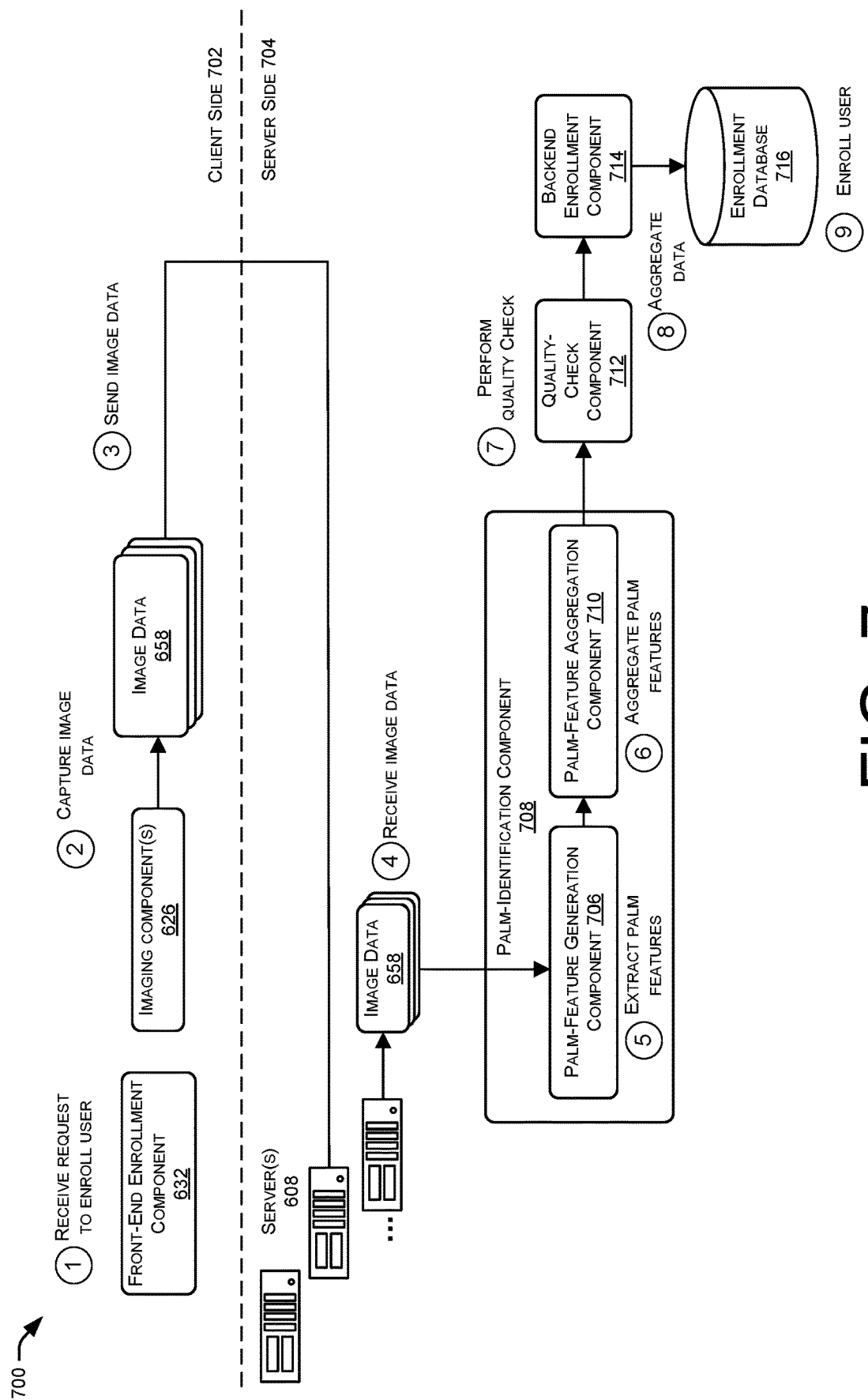
FIG. 7 illustrates an example environment including a block diagram of one or more servers configured to support at least a portion of the functionality of a user-recognition system, as well as an example flow of data within the system for enrolling a user with the user-recognition system.

FIG. 7 illustrates an example environment 700 including block diagram of the server(s) 608 configured to support at least a portion of the functionality of a user-recognition system, as well as an example flow of data within the system for enrolling a user 606 for use of the user-recognition system.

As illustrated, the environment 700 includes a client side 702 and a server side 704. However, this is merely illustrative, and some or all of the techniques may be performed entirely on the client side 702, or entirely on the server side 704. At "1," a front-end enrollment component 632 may receive a request to enroll a user 606 for use of the user-recognition system. For example, the request may comprise various types of input, such as a selection made via an I/O interface 628 (e.g., touch screen, mouse, keyboard, etc.) of a user interface element presented on a display for starting an enrollment process. Additionally, the front-end enrollment component 632 may detect a speech utterance from the user 606 indicating a request to enroll (e.g., "please enroll me," "I would like to check out," etc.). Another request example may include the user 606 sliding a user ID card into an I/O interface 628, such as a credit card, driver's license, etc. However, any type of input may be detected as a request by the front-end enrollment component 632.

Upon receiving the request to enroll, the front-end enrollment component 632 may activate or otherwise utilize the imaging component(s) 626 to generate image data 658 representing a palm of the user 606. At "2," the user-recognition device 104 then captures image data 658 and, at "3", sends the image data 658 to the server(s) 608. For instance, the user-recognition device 104 may encode and send the image data 658 over the network(s) 660 to the server(s) 608. Further, in some instances some of the images may be removed if there are not in focus, do not have a threshold level of discriminability of the characteristics of the palm of the user, or the like. This removal may occur on the client side 702 and/or the server side 704.

At "4," the server(s) 608 receive the image data and, at "5", a palm-feature generation component 706 of a palm-identification component 708 may extract palm-feature data from the image data 658. In some examples, prior to extracting the palm-feature data, the palm-feature generation component 706 may perform various operations for processing the image data 658 prior to extracting the palm-feature data. For instance, the palm-feature generation component 706 may initially perform user detection to determine that the image data 658 represents a palm of a user 606. For instance, the palm-feature generation component 706 may utilize an Integrated Sensor Processor (ISP) that performs hardware-based user detection techniques. In some examples, various software techniques may additionally, or alternatively be performed. In either instance, a bounding box may be output around the detected hand of the user 606 for an image depicting at least a portion of the user 606 and represented by the image data 658. Further, the palm-feature generation component 706 may perform hand-pose estimation in order to align the palm of the user 606 with a common coordinate system. After aligning the image of the hand into a common coordinate section, the portion of the image data corresponding to the palm may be identified and cropped. This remaining portion of the image data may thereafter be used to extract features therefrom by, for example, running a neural network on the cropped section of the image data. In some examples, hand-pose estimation may improve the extraction of features representing the palm of the user 606. Once the hand of the user 606 has been aligned, the palm-feature generation component 706 may extract features (e.g., palm-feature data) from the image data 658. In some examples, the trained model(s) may utilize a triples loss function which converts image data 658 into a feature embedding in a metric space (e.g., palm-feature data), which may allow for comparisons with subsequent feature vectors using, for example, squared distance calculation.

At "6," the palm-feature aggregation component 710 may aggregate feature data (e.g., palm-feature data) from various image data 658. For instance, the image data 658 may represent the hand of the user 606 at different angles, under different lighting conditions, or other differing characteristics. The palm-feature aggregation component 710 may aggregate the palm-feature data together, such as by averaging out feature vectors.

At "7," the quality-check component 712 may perform a quality check on the palm-feature data. For example, the quality-check component 712 may utilize trained model(s) to determine an overall metric of the quality of the extracted palm-feature data. If the overall metric is poor, or below a threshold quality level, the user-recognition system may request to acquire additional image data 658. In addition, or in the alternative, the quality-check component 712 may perform a de-duping process to ensure that the user associated with the palm-feature data hasn't already enrolled in the system. If the overall quality metric is good or acceptable, and if the de-duping process does not reveal that the user has previously enrolled in the system, a backend enrollment component 714 may aggregate the data at "8."

For example, at "8" the backend-enrollment component 714 may aggregate the palm-feature data and enroll the user at "9" in an enrollment database 716. The backend-enrollment component 714 may store associations (e.g., mappings) between the palm-feature data with a user profile of the user 606 requesting to be enrolled for use of the user-recognition system.

Figure 8:
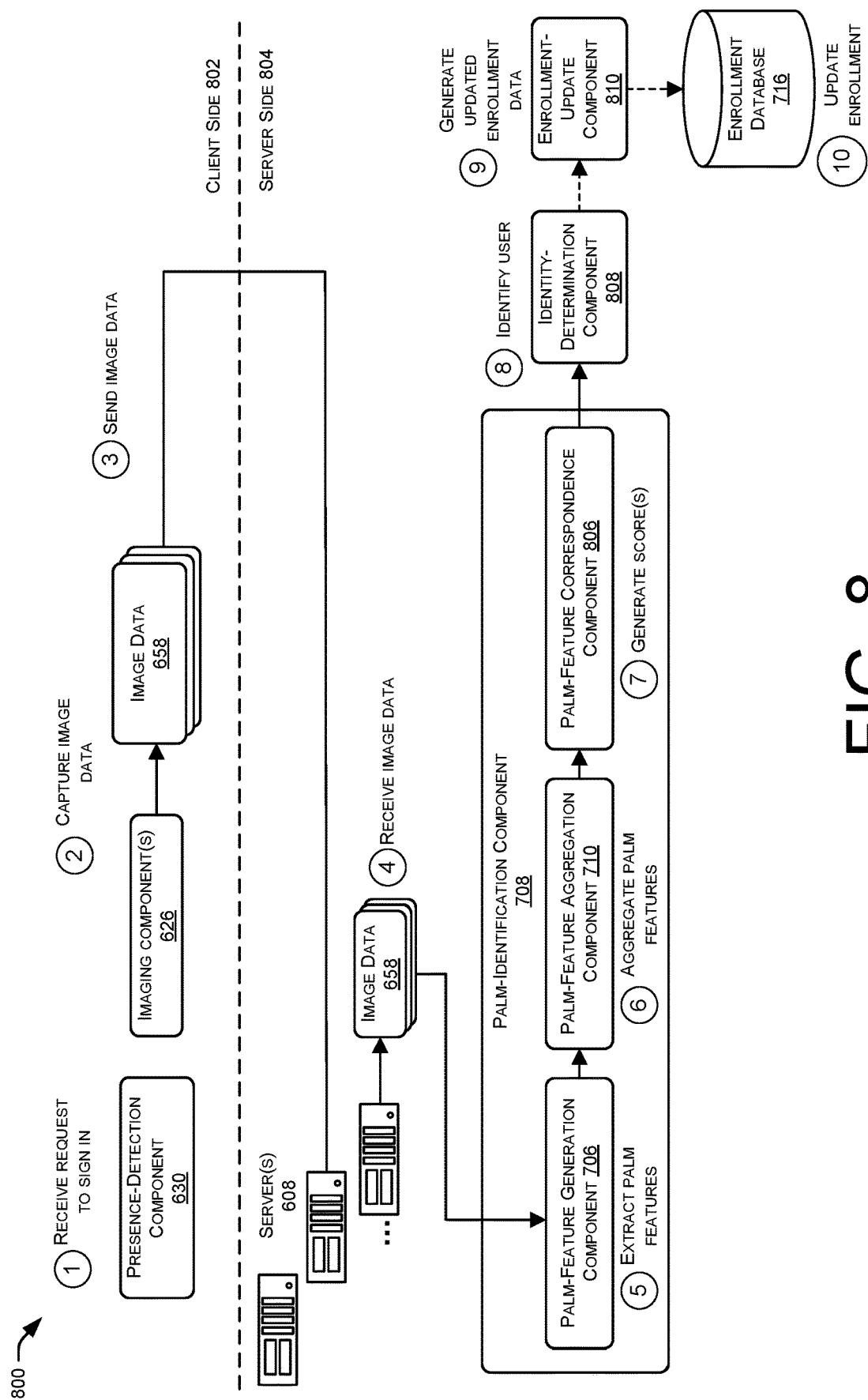
FIG. 8 illustrates an example environment including a block diagram of one or more servers configured to support at least a portion of the functionality of a user-recognition system, as well as an example flow of data within the system for identifying a user of the user-recognition system and, potentially, updating the enrollment of the user.

FIG. 8 illustrates an example environment 800 including a block diagram of the server(s) 608 configured to support at least a portion of the functionality of a user-recognition system, as well as an example flow of data within the system for identifying a user 606 of the user-recognition system and, potentially, updating the enrollment of the user. As illustrated, the environment 800 includes a client side 802 and a server side 804. However, this is merely illustrative, and some or all of the techniques may be performed entirely on the client side 802, or entirely on the server side 804.

At "1," a user requests to sign in with the user-recognition system. For example, the presence-detection component 630 may be executable by the processor(s) 620 to detect a trigger indicating presence of the user 606. The trigger detected by the presence-detection component 630 may comprise one or more types of input. For instance, the presence-detection component 630 may include logic to detect, using one or more imaging components 626, a portion of a user 606 (e.g., a hand over the imaging component(s) 626 of the user-recognition device 104). Other examples of triggers detected by the presence-detection component 630 that may indicate the presence of the user 606 may include receiving touch input (or other input, such as a mouse click) via one or more I/O interfaces 628 of the user-recognition device 104. However, any type of input may be detected as a trigger by the presence-detection component 630.

Upon identifying the request to sign in from the user, at "2" one or more imaging components 626 may generate image data 658 representing a palm of the user 606 and/or another portion of the user. At "3," the user-recognition device 104 may send the image data 658 to the server(s) 608. For instance, the user-recognition device 104 may encode and send the image data 658 over the network(s) 660 to the server(s) 608. Again, some of the image data 658 may be discarded based on the image data being out of focus, having a discriminability that is less than the threshold, and/or the like.

At "4," the servers may receive the image data 658 and, at "5", the palm-feature generation component 706 may extract palm-feature data from the image data 658. In some examples, prior to extracting the palm-feature data, the palm-feature generation component 706 may perform various operations for processing the image data 658 prior to extracting the palm-feature data. For instance, the palm-feature generation component 706 may initially perform palm detection to determine that the image data 658 represents a hand of a user 606. For instance, the palm-feature generation component 706 may utilize an Integrated Sensor Processor (ISP) that performs hardware-based user detection techniques. In some examples, various software techniques may additionally, or alternatively be performed. In either instance, a bounding box may be output around the detected hand of the user 606 for an image depicting the user 606 and represented by the image data 658. Further, the palm-feature generation component 706 may perform hand pose estimation to align the face of the user 606 with a common coordinate system. In some examples, hand pose estimation may improve the extraction of features representing the hand of the user 606. Once the hand of the user 606 has been aligned, the palm-feature generation component 706 may extract features (e.g., palm-feature data) from the image data 658. In some examples, the trained model(s) may utilize a triples loss function which converts the image data 658 into a feature embedding in a metric space (e.g., palm-feature data), which may allow for comparisons with subsequent feature vectors using, for example, squared distance calculation.

At "6," the palm-feature aggregation component 710 may aggregate feature data (e.g., palm-feature data) from various image data 658. For instance, the image data 658 may represent the hand of the user 606 at different angles, under different lighting conditions, or other differing characteristics. The palm-feature aggregation component 710 may aggregate the palm-feature data together, such as by averaging out feature vectors.

At "7," a palm-feature correspondence component 806 may generate one or more scores indicating a similarity between the aggregated features associated with the image data 658 and respective feature data stored in association with respective user profiles. In some examples, these correspondence scores may be determined, at least in part, on "distances" between the feature vector associated with the image data and respective feature vectors of the respective palm-feature data stored in association with user profiles in the enrollment database 716.

At "8," an identity-determination component 808 may determine the identity of the user based on the correspondence scores. For example, the identity-determination component 808 may identity the user profile associated with the feature vector having the closest distance to the feature vector associated with the image data 658 and may deem the associated user the user associated with the image data 658.

At "9", in some instances the enrollment-update component 810 may use the recently received palm-feature data associated with the image data to update the enrollment of the identified user. For example, the enrollment-update component 810 may detect occurrence of a predefined event that results in the updating of the enrollment data. This may include a predefined amount of time having elapsed since the most-recent or least-recent feature data being associated with the profile, based on a characteristic of the transaction occurring at the facility in association with the image data 658 (e.g., a cost or number of items), based on a threshold amount of change between the current feature data and previous feature data associated with the user profile, based on an explicit request from the user associated with the user profiled, and/or the like. In some instances, the predefined event may comprise an audit component determining that the received palm-feature data corresponds to the identified user with a confidence level that is greater than the previously discussed high threshold confidence level. That is, while the recognition process described with reference to steps "7"-"8" may be performed with reference to enrollment data, the audit component may determine a confidence level using both the enrollment data and image and/or feature data associate with previous recognition attempts. If the audit component thereafter computes a confidence level that is greater than the relatively high confidence level, then the enrollment-update component 810 may determine to update the enrollment data of the identified user.

At "10", the enrollment-update component 810 updates the enrollment data associated with the corresponding user profile in the enrollment database 716. As described above, this may include storing the feature data and/or image data alongside existing feature data and/or image data associated with the profile, averaging the existing feature data with the new feature data, and/or the like.

Figure 9:
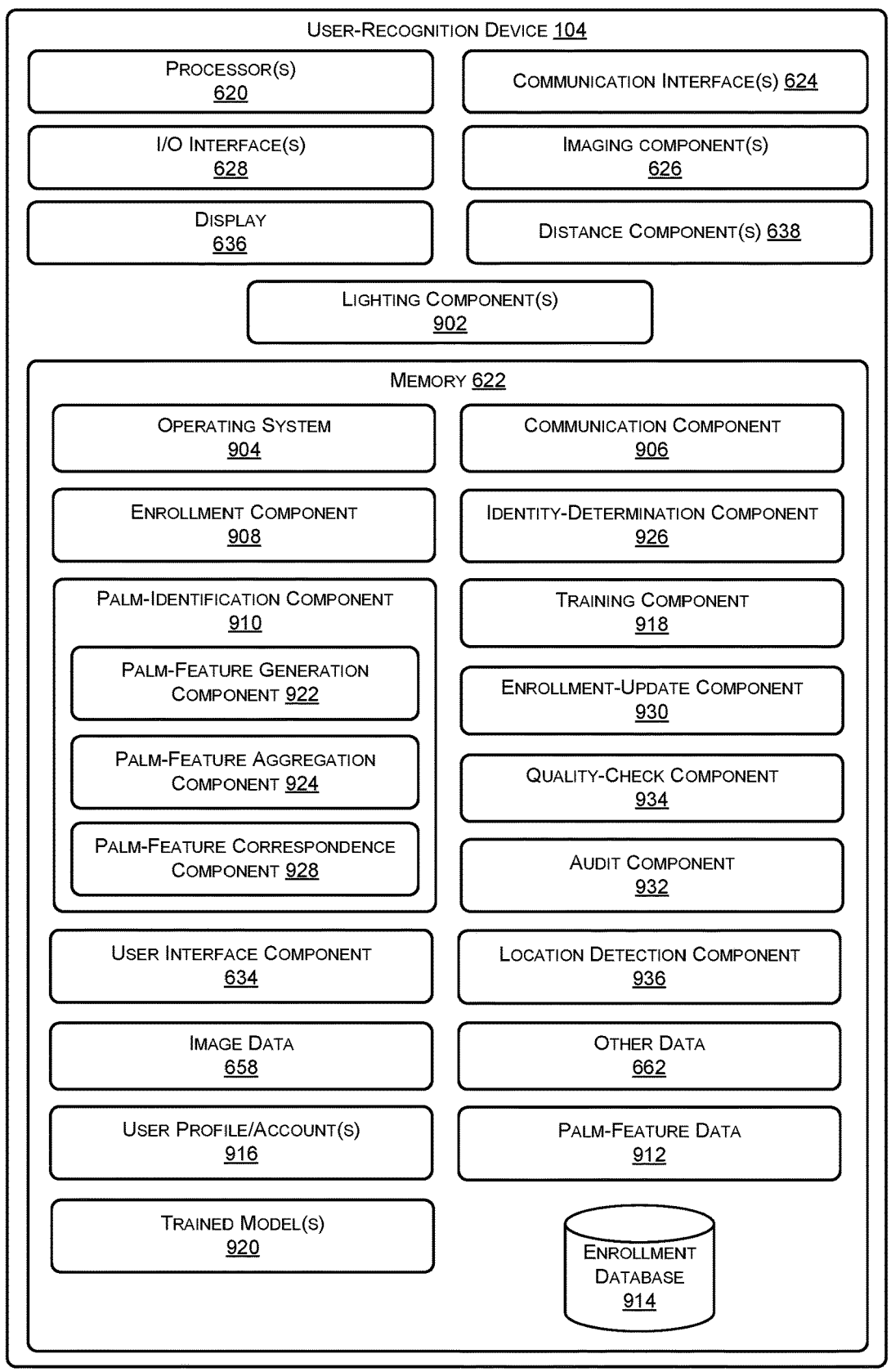
FIG. 9 illustrates example components of a user-recognition device configured to support at least a portion of the functionality of a user-recognition system.

FIG. 9 illustrates example components of the user-recognition device 104 configured to support at least a portion of the functionality of a user-recognition system. In some examples, the user-recognition system described herein may be supported entirely, or at least partially, by the user-recognition device 104 in conjunction with the server(s) 608. The user-recognition device 104 may include one or more hardware processors 620 (processors) configured to execute one or more stored instructions. The processor(s) 620 may comprise one or more cores. The user-recognition device 104 may include one or more input/output (I/O) interface(s) 628 to allow the processor 620 or other portions of the user-recognition device 104 to communicate with other devices. The I/O interface(s) 628 may comprise Inter-Integrated Circuit (I2C), Serial Peripheral Interface bus (SPI), Universal Serial Bus (USB) as promulgated by the USB Implementers Forum, RS-232, and so forth.

The user-recognition device 104 may also include one or more communication interfaces 624. The communication interface(s) 624 are configured to provide communications between the user-recognition device 104 and other devices, such as the server(s) 608, the interface devices, routers, and so forth. The communication interface(s) 624 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The user-recognition device 104 may further include one or more distance components 638. The distance component(s) 638 may include, but are not limited to, IR sensor(s), LIDAR sensor(s), and/or any other type of sensor that may detect a distance of an object. Additionally, the user-recognition device 104 may include one or more lighting components 902. In some instances, the lighting component(s) 902 include a light ring that is located around an imaging component (e.g., the imaging component 406). In some instances, the user-recognition device 104 uses the lighting component(s) 902 to provide feedback to the user. For instance, the user-recognition device 104 may cause the lighting component(s) 902 to emit light using one or more patterns when the user-recognition device 104 detects the hand of the user, determines that the hand of the user is located in the target location, identifies a user profile associated with the user, and/or the like.

The user-recognition device 104 may also include one or more busses or other internal communications hardware or software that allow for the transfer of data between the various modules and components of the user-recognition device 104.

As shown in FIG. 9, the user-recognition device 104 includes one or more memories 622. The memory 622 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 622 provides storage of computer-readable instructions, data structures, program modules, and other data for the operation of the user-recognition device 104. A few example functional modules are shown stored in the memory 622, although the same functionality may alternatively be implemented in hardware, firmware, or as a system on a chip (SOC).

The memory 622 may include at least one operating system (OS) 904. The OS 904 is configured to manage hardware resource devices such as the I/O interface(s) 628, the imaging component(s) 626, the display 636, the distance component(s) 638, and the lighting component(s) 902, and provide various services to applications or modules executing on the processor(s) 620. The OS 904 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 622. These modules may be executed as foreground applications, background tasks, daemons, and so forth.

A communication component 906 may be configured to establish communications with the server(s) 608 and/or or other devices. The communications may be authenticated, encrypted, and so forth.

An enrollment component 908 may be configured to perform various operations for enrolling a user for use of the user-recognition system (e.g., similar to the backend enrollment component 714). For instance, the enrollment component 908 may perform various operations, and/or cause other components to perform various operations, to enroll users in the user-recognition system. In some instance, the enrollment component 908 may at least partly control a palm-identification component 910 that performs operations for analyzing image data 658 depicting a palm or other portion of the user. In some examples, the enrollment component 908 may cause the palm-identification component 910 to analyze the image data 658 and extract features which represent a palm of the user, such as palm-feature data 912.

After obtaining, determining, and/or generating the palm-feature data 912, the enrollment component 908 may enroll the user in an enrollment database 914 which indicates that the user is enrolled for use of the user-recognition system. In some examples, the enrollment component 908 may associate, or map, the various data to a user profile/account 916 that is associated with the user. For example, the enrollment component 908 may map, for each enrolled user, respective palm-feature data 912 to corresponding user profiles 916 in the enrollment database 914. Thus, the enrollment database 914 may store indications of user profiles 916, as well as the data for users associated with each of the user profiles 916. When a user is enrolled for use of the user-recognition system, the enrollment component 908 may map, or store an association, between the user's palm-feature data 912 with the user profile 916 for that user.

Further, the enrollment component 908 may cause a training component 918 to train one or more trained models 920. The training component 918 may utilize the palm-feature data 912 to train the trained model(s) 920 to perform various operations for extracting and/or generating, from the image data 658, the palm-feature data 912. The trained model(s) 920 may comprise any type of model, such as machine-learning models, including but not limited to artificial neural networks, classifiers, decision trees, support vector machines, Bayesian networks, and so forth.

As a specific example, the trained model(s) 920 may include or comprise one or more convolution neural networks (CNNs), recursive neural networks, and/or any other artificial networks, that are trained to analyze image data 658 received as input, and extract, determine, identify, generate, etc., palm-feature data 912 representing a palm of the user. As a specific example, the palm-feature data 912 may comprise a 128-dimension feature vector representing the palm of the user. In examples where the trained model(s) 920 include one or more CNNs, various functions may be utilized to transform the image data 658 into a metric space, such as a triplet loss function. Thus, the training component 918 may train the CNNs of the trained model(s) 920 using various functions, such as a triplet loss function, to extract, identity, or otherwise determine palm-feature data 912 from input image data 658. Once in the metric space, extracted feature data may be compared, or matched, by computing a distance between the extracted feature data and feature data stored in the enrollment database 914. For instance, when feature data is extracted from the image data 658 into palm-feature data 912 by the trained model(s) 920, the extracted palm-feature data 912 may then be compared to stored data in the enrollment database 914 to identify a user profile for the user represented in the input image data 658. For instance, the extracted palm-feature data 912 may comprise a vector that is compared with stored vectors in the enrollment database 914 to identify which stored vectors have the smallest "distance" between the extracted feature data. The smaller the distance, the closer the strength of correspondence between the extracted feature data and the stored feature data representing users that are enrolled for use of the user-recognition system. In some examples, other calculations may be performed, such as finding a cosine of an angle between two vectors, depending on the network utilized by the trained model(s) 920. However, any type of models may be utilized for the trained model(s) 920.

The palm-identification component 910 may include various sub-components for performing various operations. For instance, the palm-identification component 910 may include a palm-feature generation component 922 to extract or otherwise generate feature data from the image data 658 (e.g., similar to the palm-feature generation component 706). The palm-feature generation component 910 may utilize the trained model(s) 920, and/or include algorithms, to perform any type of feature extraction method, or embedding, to analyze the image data 658 and extract the palm-feature data 912. For instance, the palm-feature generation component 922 may utilize state-of-the-art models, such as clustering, artificial neural networks, scale-invariant feature transform, edge detection, or any other type of extraction or embedding technology, to extract palm-feature data 912 from the image data 658.

The palm-identification component 910 may further include a palm-feature aggregation component 924 configured to aggregate feature data for a user (e.g., similar to the palm-feature aggregation component 710). For instance, the palm-feature aggregation component 924 may combine palm-feature data 912 that has been extracted from a group of images depicting the user, such as by averaging the features in the palm-feature data 912.

Once a user is enrolled for use of the user-recognition system, an identity-determination component 926 may be utilized to determine and/or verify an identity of a user that interacted with the user-recognition device 104. For example, the user-recognition device 104 may use the image data 658 and the identity-determination component 926 (which may be similar to the identity-determination component 808) to determine an identity of the user, where the enrollment database 914 indicates the identity of the user by, for example, indicating the user profile 916 that is associated with that user's identity.

The identity-determination component 926 may cause a palm-feature correspondence component 928 to perform various operations for determining or identifying a user whose palm is depicted in the received image data 658. For example, the palm-feature correspondence component 928 may compare the palm-feature data 912 for the received image data 658 with palm-feature data 912 stored in the enrollment database 914 for different user profiles 916 of users enrolled in the user-recognition system in order to determine user profiles 916 for one or more users whose respective palm-feature data 912 correspond to the extracted palm-feature data 912. In some instances, the score calculated by the palm-feature correspondence component 928 may be compared to a threshold and, if the score is greater than the threshold, may result in identification of the user. If multiple user profiles are associated with scores that are greater than the threshold, then the user profile associated with the highest may be deemed to be associated with the image data 658 and/or further analysis may be performed to identify the appropriate user. Further, in some instances, the user-recognition system may employ set-reduction techniques to identify, based on an initial comparison, a top "N" group of user profiles 916 of users whose respective palm-feature data 912 most strongly correspond to the extracted palm-feature data 912. In some examples, a single user identity/profile 916 may be determined as corresponding to the input palm-feature data 912. However, in some examples, a group of top "N" candidates may be identified by the trained model(s) 920 as corresponding with a threshold amount of strength (e.g., 50% correspondence, 95% correspondence, etc.) to the extracted palm-feature data 912. A second level of deeper analysis may then be performed to identify a single user from the "N" candidates.

Further, the memory 622 may store an enrollment-update component 930 configured to update the palm-feature data 912 stored in association with user profiles to allow for removal of stale feature data and use of more recent feature data (e.g., similar to the enrollment-update component 810). As introduced above, as a user provides image data of the user's palm over time, the enrollment-update component 930 may use feature data from this new image data to generate and store additional feature data associated with the user. Further, the enrollment-update component 930 may remove or lessen a weight associated with older feature data.

In addition, the memory 622 may store an audit component 932 configured to perform one or more auditing processes in response to occurrence of one or more predefined events. For example, the audit component 932 may perform a nightly auditing processes comprising rich comparison of palm-feature data associated with respective user profiles to one another to identify any errors previously made by the system. After identifying an error, the system may correct the error and may also this information to further train the trained model(s) 920 utilizing techniques similar to those performed by the enrollment component 908.

Additionally, the memory 622 may store a quality-check component 934 which determines an overall metric of the quality of the extracted palm-feature data 912. For instance, the quality-check component 934 may determine that additional image data 658 needs to be obtained for a user for various reasons.

The memory 622 may also store a location detection component 936 configured to determine the location of the hand with respect to the user-recognition device 104 (and/or the imaging component of the user-recognition device 104). For instance, and as described herein, the location detection component 936 may determine one or more points located on the hand. The location detection component 936 may then use the one or more points to identify the center of the palm of the hand with respect to the user-recognition device 104. In some instances, the location detection component 936 determines the location of the hand at given time intervals. For instance, the location detection component 936 may determine the location of the user's hand every millisecond, second, and/or the like. In some examples, the location detection component 936 determines the location of the user's hand using each frame represented by the image data 658, every other frame represented by the image data 658, every fifth frame represented by the image data 658, and/or the like.

The memory 622 may also store the user interface component 634 configured to generate and/or update the user interfaces described herein. For instance, once the hand is detected, the user interface component 634 may cause the display 636 to present a user interface that includes a graphical element indicating the target location for placing the hand. The user interface component 634 may then use the locations determined by the location detection component 936 to present and/or update a graphical element indicating the current location of the hand. Once the location detection component 936 determines the location of the hand is proximate to the target location, the user interface component 634 may cause the user interface to indicate that the user-recognition device 104 has captured the biometric data.

FIGS. 10A-12 illustrate various processes for providing instructions associated with inputting biometric data. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 10A:
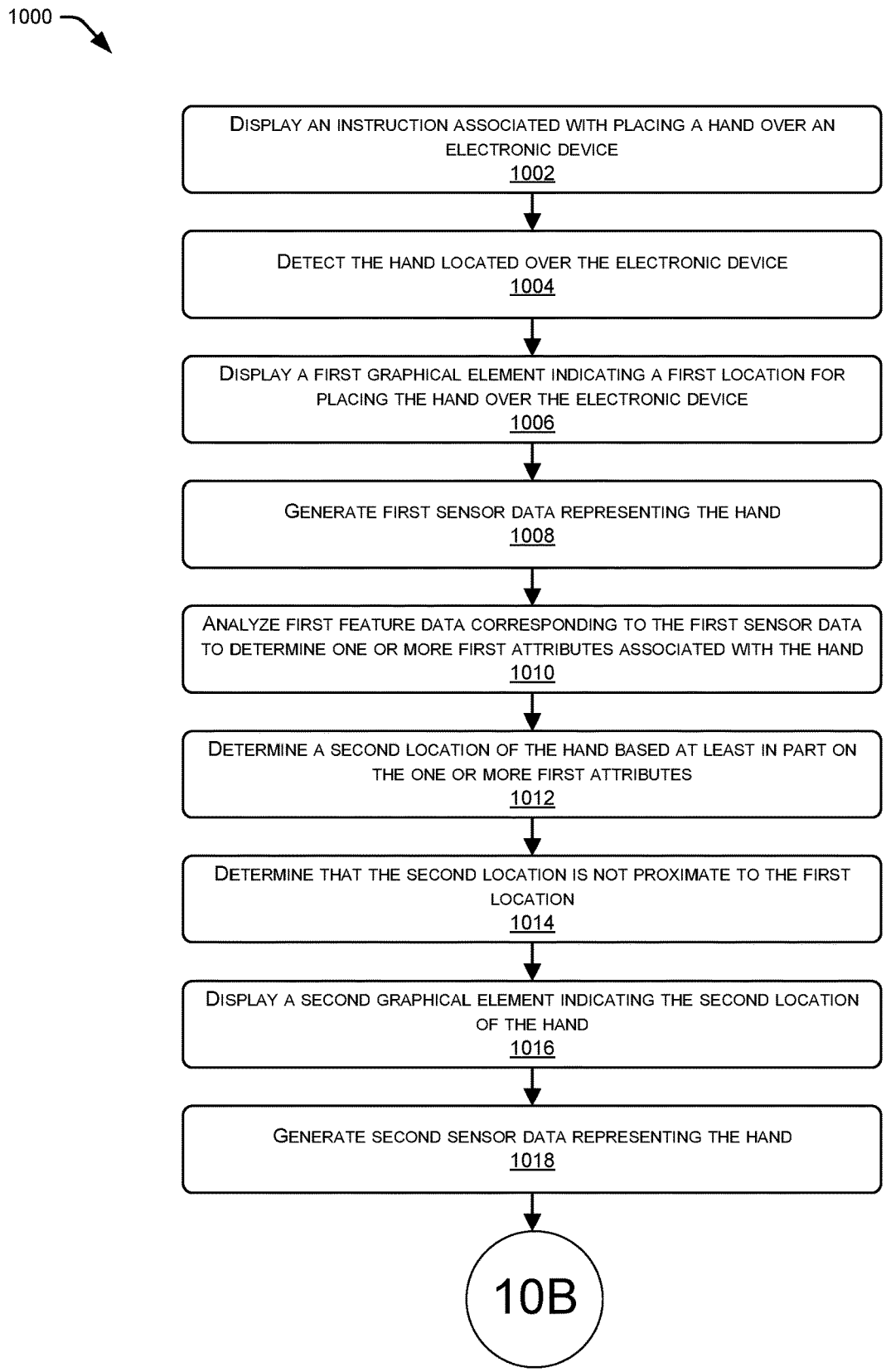
FIGS. 10A-10B collectively illustrate a flow diagram of an example process for providing instructions associated with placing a hand at a target location relative to a user-recognition device.
Figure 10B:
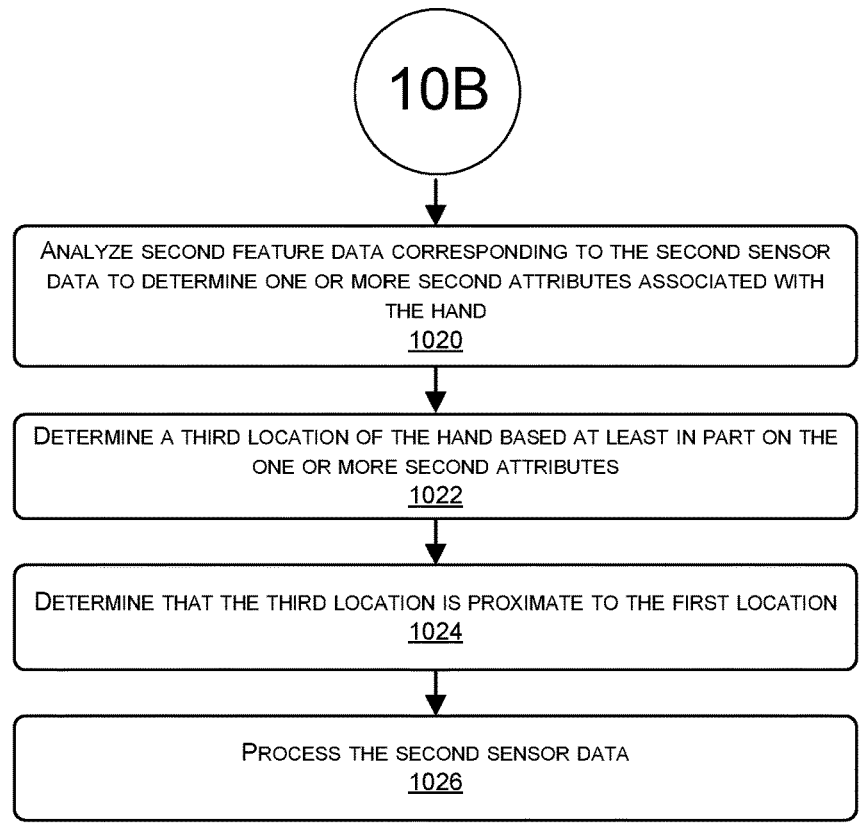

FIG. 10 illustrates a flow diagram of an example process 1000 for providing instructions associated with placing a hand at a target location relative to the user-recognition device 104. At 1002, the process 1000 may include displaying an instruction associated with placing a hand over an electronic device. For instance, the user-recognition device 104 may display a user interface that includes the instruction to place the hand over the user-recognition device 104. In some instances, the user interface further includes an image illustrating how to place the hand over the user-recognition device 104. In some instances, the user-recognition device 104 displays the user interface before detecting the user.

At 1004, the process 1000 may include detecting the hand located over the electronic device. For instance, the user-recognition device 104 may detect the hand located over the user-recognition device 104. The user-recognition device 104 may detect the hand when the hand is located within a threshold distance above an imaging component of the user-recognition device 104. In some instances, the user-recognition device 104 detects the hand using a distance sensor. In some instances, the user-recognition device 104 detects the hand using one or more imaging sensors.

At 1006, the process 1000 may include displaying a first graphical element indicating a first location for placing the hand over the electronic device. For instance, the user-recognition device 104 may display a user interface that includes the first graphical element. The first graphical element may be associated with both a first vertical location and a first horizontal location above the imaging component. In some instances, the first graphical element includes a circle. However, in other instances, the first graphical element may include any other shape.

At 1008, the process 1000 may include generating first sensor data representing the hand and at 1010, the process 1000 may include analyzing first feature data corresponding to the first sensor data to determine one or more first attributes associated with the hand. For instance, the user-recognition device 104 may generate the first sensor data based on detecting the hand. The first sensor data may include at least first image data representing the hand and first distance data indicating a first distance to the hand. The user-recognition device 104 may then generate the first feature data corresponding to the first sensor data. For instance, the first feature data may indicate one or more key points on the hand (e.g., determined using the first image data) and the first distance to the hand (e.g., determined using the first distance data). The user-recognition device 104 may then determine the one or more first attributes using the first feature data. The one or more first attributes may include the one or more key points and the first distance.

At 1012, the process 1000 may include determining a second location of the hand based at least in part on the one or more first attributes. For instance, the user-recognition device 104 may analyze the one or more first features to determine a center of a palm of the hand and the first distance to the hand. The user-recognition device 104 may then determine the second location using the center of the palm and the first distance. For instance, the user-recognition device 104 may determine a second vertical location of the hand using the first distance and a second horizontal location of the hand using the center of the palm.

At 1014, the process 1000 may include determining that the second location is not proximate to the first location. For instance, the user-recognition device 104 may determine that the second location is not proximate to the first location. In some instances, to make the determination, the user-recognition device 104 may determine that the second vertical location is outside (e.g., more than) of a threshold distance to the first vertical location (e.g., in the z-direction) and/or the second horizontal location is outside of a threshold distance to the first horizontal location (e.g., in the x-direction and/or the y-direction).

At 1016, the process 1000 may include displaying a second graphical element indicating the second location of the hand. For instance, the user-recognition device 104 may display, using the user interface, the second graphical element along with the first graphical element. In some instances, the size of the second graphical element may correspond to the second vertical location of the hand and the position of the second graphical element may correspond to the second horizontal location of the hand. In some instances, the user-recognition device 104 may further display one or more instructions for moving the hand to the first location.

At 1018, the process 1000 may include generating second sensor data representing the hand and at 1020, the process 1000 may include analyzing second feature data corresponding to the second sensor data to determine one or more second attributes associated with the hand. For instance, the user-recognition device 104 may generate the second sensor data. The second sensor data may include at least second image data representing the hand and second distance data indicating a second distance to the hand. The user-recognition device 104 may then generate the second feature data corresponding to the second sensor data. For instance, the second feature data may indicate one or more key points on the hand (e.g., determined using the second image data) and the second distance to the hand (e.g., determined using the second distance data). The user-recognition device 104 may then determine the one or more second attributes using the second feature data. The one or more second attributes may include the one or more key points and the second distance.

At 1022, the process 1000 may include determining a third location of the hand based at least in part on the one or more second attributes. For instance, the user-recognition device 104 may analyze the one or more second features to determine a center of a palm of the hand and the second distance to the hand. The user-recognition device 104 may then determine the third location using the center of the palm and the second distance. For instance, the user-recognition device 104 may determine a third vertical location of the hand using the second distance and a third horizontal location of the hand using the center of the palm.

At 1024, the process 1000 may include determining that the third location is proximate to the first location. For instance, the user-recognition device 104 may determine that the third location is proximate to the first location. In some instances, to make the determination, the user-recognition device 104 may determine that the third vertical location is within the threshold distance to the first vertical location (e.g., in the z-direction) and the third horizontal location is within the threshold distance to the first horizontal location (e.g., in the x-direction and the y-direction).

At 1026, the process 1000 may include processing the second sensor data. For instance, in some examples, based on determining that the third location is proximate to the first location, the user-recognition device 104 may analyze the second feature data with respect to feature data associated with one or more user profiles. Based on the analysis, the user-recognition device 104 may determine that the second feature data corresponds to third feature data associated with the user profile. Additionally, or alternatively, in some examples, based on determining that the third location is proximate to the first location, the user-recognition device 104 may send the second sensor data to the server(s) 608 for processing.

Figure 11:
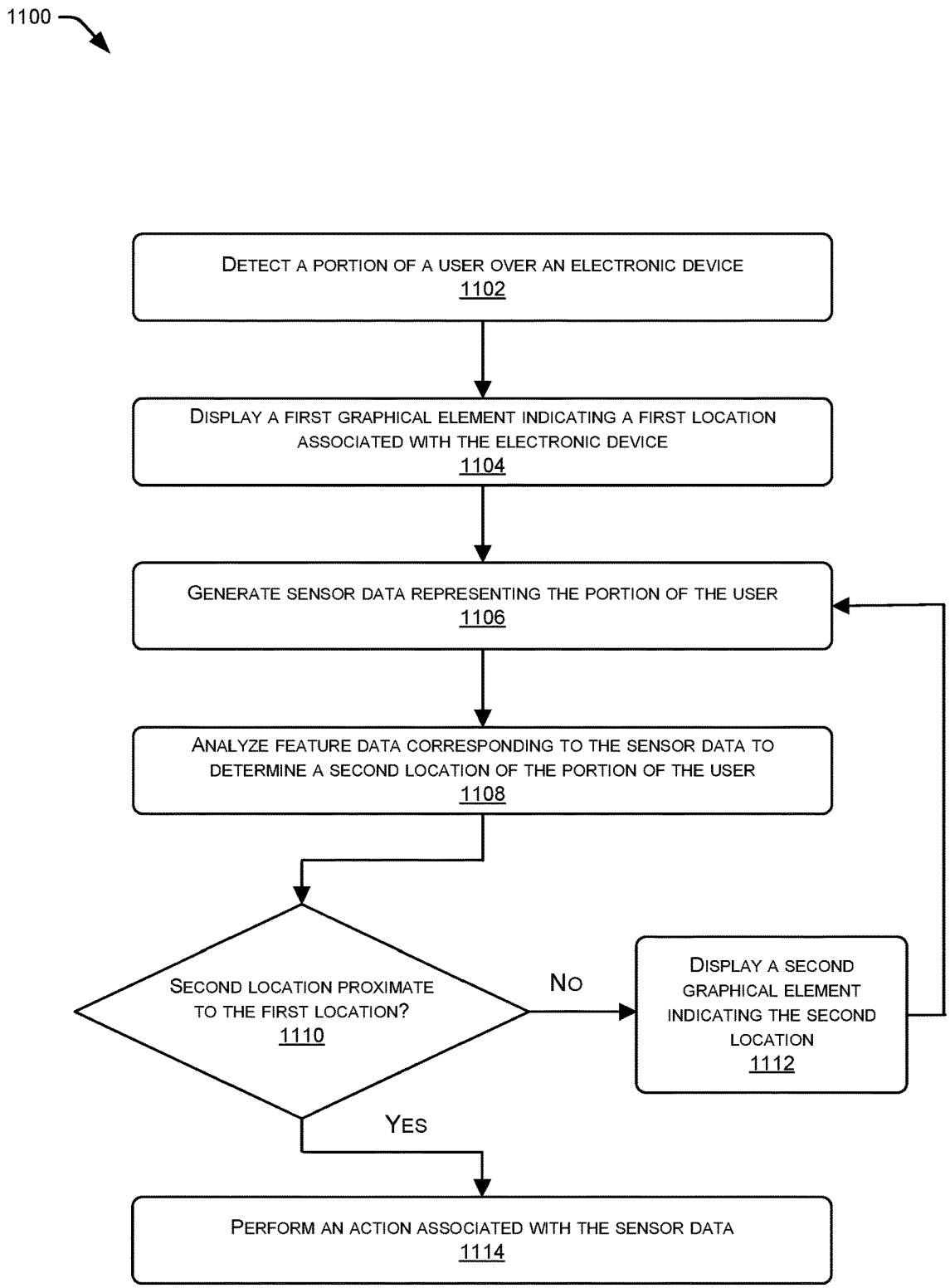
FIG. 11 illustrates a flow diagram of an example process for providing instructions associated with inputting biometric data.

FIG. 11 illustrates a flow diagram of an example process 1100 for providing instructions associated with inputting biometric data. At 1102, the process 1100 may include detecting a portion of a user over an electronic device. For instance, the user-recognition device 104 may detect the portion of the user located over the user-recognition device 104. The user-recognition device 104 may detect the portion of the user when the portion of the user is located within a threshold distance above an imaging component of the user-recognition device 104. In some instances, the user-recognition device 104 detects the portion of the user using a distance sensor. In some instances, the user-recognition device 104 detects the portion of the user using one or more imaging sensors.

At 1104, the process 1100 may include displaying a first graphical element indicating a first location associated with an electronic device. For instance, based on detecting the portion of the user, the user-recognition device 104 may display a user interface that includes the first graphical element. The first graphical element may be associated with both a first vertical location and a first horizontal location above an imaging component of the user-recognition device 104. In some instances, the first graphical element includes a circle. However, in other instances, the first graphical element may include any other shape.

At 1106, the process 1100 may include generating sensor data representing the portion of the user and at 1108, the process 1100 may include analyzing feature data corresponding to the sensor data to determine a second location of the portion of the user. For instance, the user-recognition device 104 may generate the sensor data based on detecting the portion of the user. The sensor data may include at least image data representing the portion of the user and distance data indicating a distance to the portion of the user. The user-recognition device 104 may then generate the feature data corresponding to the sensor data. For instance, the feature data may indicate one or more key points on the portion of the user (e.g., determined using the image data) and the distance to the portion of the user (e.g., determined using the distance data). The user-recognition device 104 may then determine the second location using the one or more key points and the distance. The second location may be associated with a second vertical location and a second horizontal location.

At 1110, the process 1100 may include determining whether the second location is proximate to the first location. For instance, the user-recognition device 104 may determine whether the second location is proximate to the first location. In some instances, the user-recognition device 104 may determine that the second location is proximate to the first location based on determining that the second vertical location is within a threshold distance to the first vertical location (e.g., in the z-direction) and that the second horizontal location is within a threshold distance the first horizontal location (e.g., in the x-direction and the y-direction).

If at 1110 it is determined that the second location is not proximate to the first location, then at 1112, the process 1100 may include displaying a second graphical element indicating the second location. For instance, the user-recognition device 104 may display, using the user interface, the second graphical element along with the first graphical element. In some instances, the size of the second graphical element may corresponding to the second vertical location of the portion of the user and the position of the second graphical element may correspond to the second horizontal location of the portion of the user. In some instances, the user-recognition device 104 may further display one or more instructions for moving the portion of the user to the first location. In some instances, the process 1100 may then repeat 1106-1110 until the user-recognition devices 104 determines that the second location is proximate to the first location.

However, if at 1110 it is determined that the second location is proximate to the first location, then at 1114, the process 1100 may include performing an action associated with the sensor data. For instance, based on determining that the second location is proximate to the first location, the user-recognition device 104 may perform the action. In some instances, the action may include generating a user profile using the sensor data and/or the feature data. In some instances, the action may include identifying a user profile associated with the sensor data and/or the feature data. Still, in some instances, the action may include sending the sensor data and/or the feature data to the server(s) 608.

Figure 12:
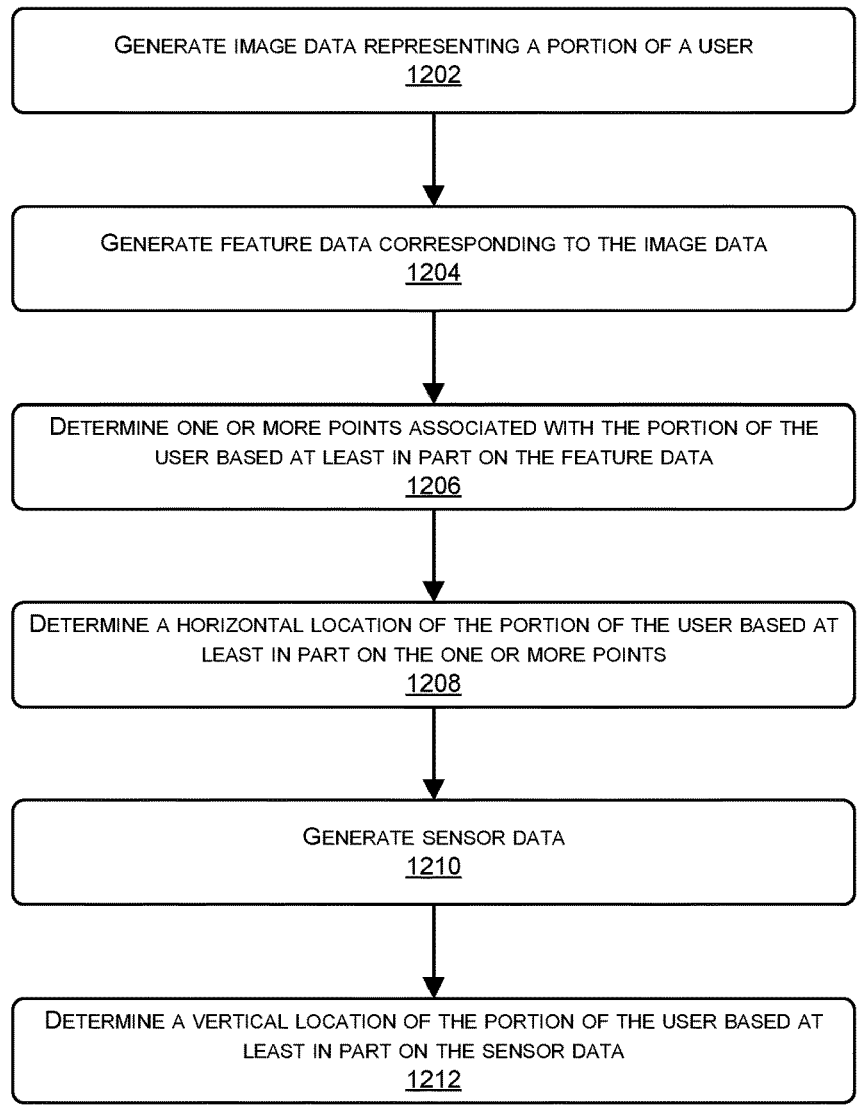
FIG. 12 illustrates a flow diagram of an example process for determining a location of a portion of a user with respect to an electronic device.

FIG. 12 illustrates a flow diagram of an example process 1200 for determining a location of a portion of a user with respect to an electronic device. At 1202, the process 1200 may include generating image data representing a portion of a user and at 1204, the process 1200 may include generating feature data corresponding to the image data. For instance, the user-recognition device 104 may generate the image data representing the portion of the user, such as the hand of the user. The user-recognition device 104 may then generate the feature data corresponding to the image data. The feature data may indicate one or more points on the portion of the user.

At 1206, the process 1200 may include determining one or more points associated with the portion of the user based at least in part on the feature data and at 1208, the process 1200 may include determining a horizontal location of the portion of the user based at least in part on the one or more points. For instance, the user-recognition device 104 may determine the one or more points represented by the feature data. The user-recognition device 104 may then determining a bounding box that includes the one or more points. Using the bounding box, the user-recognition device 104 may determine the center point of the portion of the user. In some instances, the center point of the portion of the user may include the center of the bounding box. The user-recognition device 104 may then determine the horizontal location of the portion of the user using the center of the portion of the user.

At 1210, the process 1200 may include generating sensor data and at 1212, the process 1200 may include determining a vertical location of the portion of the user based at least in part on the sensor data. For instance, the user-recognition device 104 may generate the sensor data, such as distance data to the portion of the user. The user-recognition device 104 may then determine the vertical distance to the portion of the user using the sensor data. Additionally, the user-recognition device 104 may determine the vertical location of the portion of the user based on the vertical distance. In some instances, the user-recognition device 104 may then determine the location of the portion of the user based on the horizontal location and the vertical location.

Figure 13:
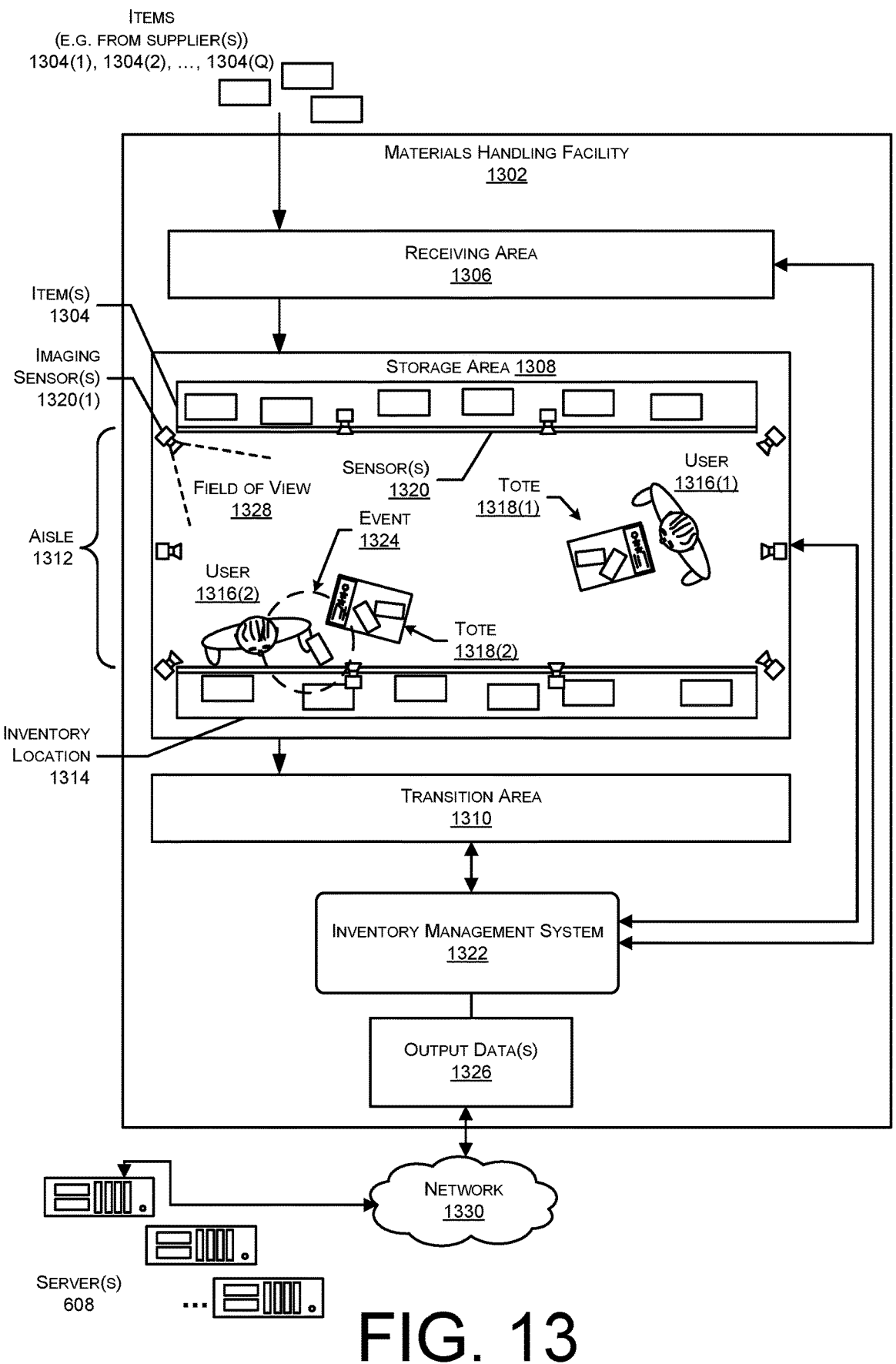
FIG. 13 is a block diagram of an example materials handling facility that includes sensors and an inventory management system configured to generate output regarding events occurring in the facility using the sensor data.
Figure 14:
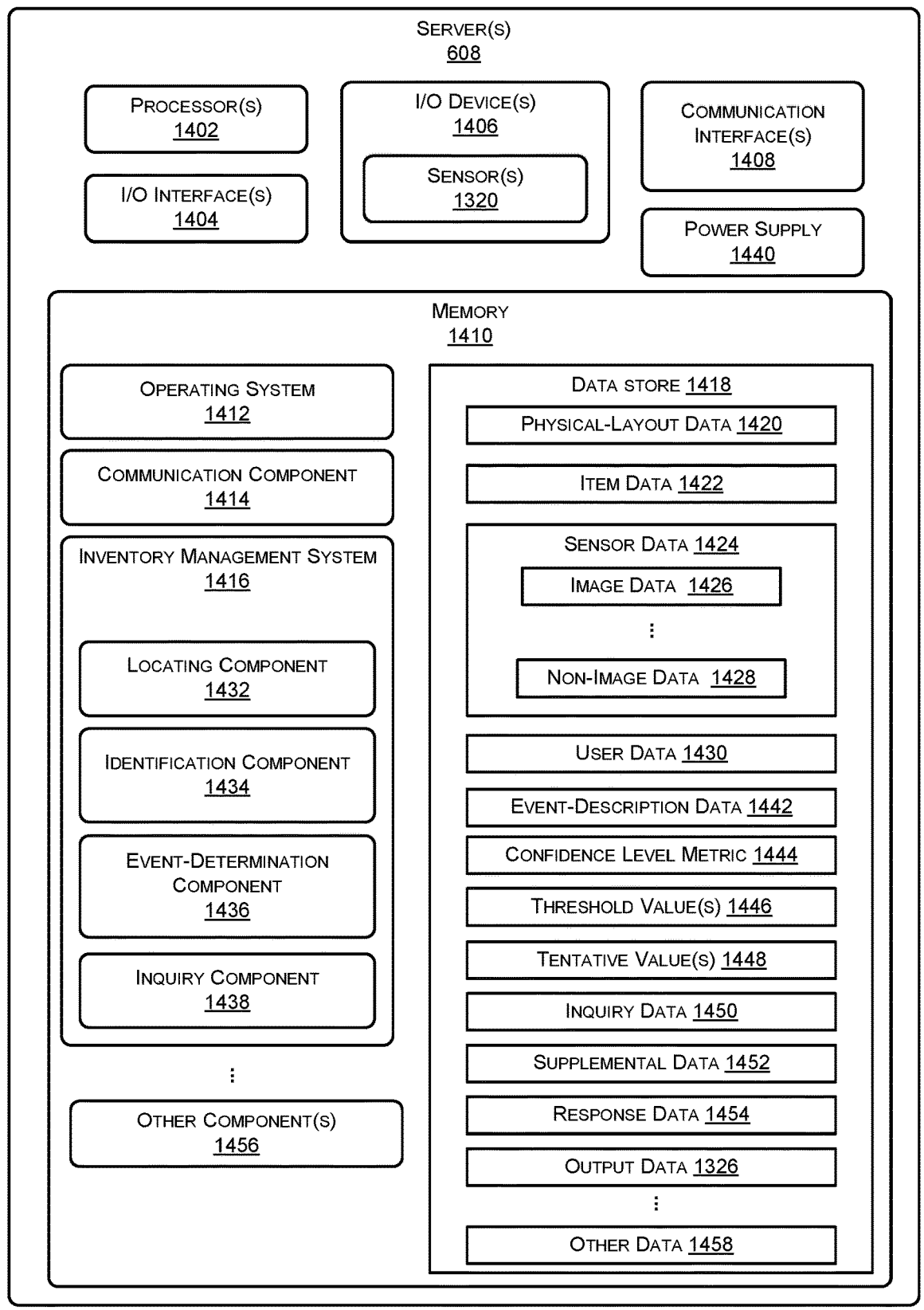
FIG. 14 illustrates a block diagram of one or more servers configured to support operation of the facility.

FIGS. 13 and 14 represent an illustrative materials handling environment, such as the materials handling facility 602, in which the techniques described herein may be applied to cameras monitoring the environments as described below. However, the following description is merely one illustrative example of an industry and environment in which the techniques described herein may be utilized.

An implementation of a materials handling facility 1302 (e.g., facility 1302) configured to store and manage inventory items is illustrated in FIG. 13. A materials handling facility 1302 comprises one or more physical structures or areas within which one or more items 1304(1), 1304(2), . . . , 1304(Q) (generally denoted as 1304) may be held. As used in this disclosure, letters in parenthesis such as "(Q)" indicate an integer result. The items 1304 comprise physical goods, such as books, pharmaceuticals, repair parts, electronic gear, groceries, and so forth.

The facility 1302 may include one or more areas designated for different functions with regard to inventory handling. In this illustration, the facility 1302 includes a receiving area 1306, a storage area 1308, and a transition area 1310. The receiving area 1306 may be configured to accept items 1304, such as from suppliers, for intake into the facility 1302. For example, the receiving area 1306 may include a loading dock at which trucks or other freight conveyances unload the items 1304.

The storage area 1308 is configured to store the items 1304. The storage area 1308 may be arranged in various physical configurations. In one implementation, the storage area 1308 may include one or more aisles 1312. The aisle 1312 may be configured with, or defined by, inventory locations 1314 on one or both sides of the aisle 1312. The inventory locations 1314 may include one or more of shelves, racks, cases, cabinets, bins, floor locations, or other suitable storage mechanisms for holding or storing the items 1304. The inventory locations 1314 may be affixed to the floor or another portion of the facility's structure, or may be movable such that the arrangements of aisles 1312 may be reconfigurable. In some implementations, the inventory locations 1314 may be configured to move independently of an outside operator. For example, the inventory locations 1314 may comprise a rack with a power source and a motor, operable by a computing device to allow the rack to move from one location within the facility 1302 to another.

One or more users 1316(1), 1316(2), . . . , 1316(U) (generally denoted as 1316), totes 1318(1), 1318(2), . . . , 1318(T) (generally denoted as 1318) or other material handling apparatus may move within the facility 1302. For example, the users 1316 may move about within the facility 1302 to pick or place the items 1304 in various inventory locations 1314, placing them on the totes 1318 for ease of transport. An individual tote 1318 is configured to carry or otherwise transport one or more items 1304. For example, a tote 1318 may include a basket, a cart, a bag, and so forth. In other implementations, other agencies such as robots, forklifts, cranes, aerial drones, and so forth, may move about the facility 1302 picking, placing, or otherwise moving the items 1304.

One or more sensors 1320 may be configured to acquire information in the facility 1302. The sensors 1320 in the facility 1302 may include sensors fixed in the environment (e.g., ceiling-mounted cameras) or otherwise, such as sensors in the possession of users (e.g., mobile phones, tablets, etc.). The sensors 1320 may include, but are not limited to, cameras 1320(1), weight sensors, radio frequency (RF) receivers, temperature sensors, humidity sensors, vibration sensors, and so forth. The sensors 1320 may be stationary or mobile, relative to the facility 1302. For example, the inventory locations 1314 may contain cameras 1320(1) configured to acquire images of pick or placement of items 1304 on shelves, of the users 1316(1) and 1316(2) in the facility 1302, and so forth. In another example, the floor of the facility 1302 may include weight sensors configured to determine a weight of the users 1316 or other object thereupon.

During operation of the facility 1302, the sensors 1320 may be configured to provide information suitable for identifying new locations of objects or other occurrences within the facility 1302. For example, a series of images acquired by a camera 1320(1) may indicate removal of an item 1304 from a particular inventory location 1314 by one of the users 1316 and placement of the item 1304 on or at least partially within one of the totes 1318.

While the storage area 1308 is depicted as having one or more aisles 1312, inventory locations 1314 storing the items 1304, sensors 1320, and so forth, it is understood that the receiving area 1306, the transition area 1310, or other areas of the facility 1302 may be similarly equipped. Furthermore, the arrangement of the various areas within the facility 1302 is depicted functionally rather than schematically. For example, multiple different receiving areas 1306, storage areas 1308, and transition areas 1310 may be interspersed rather than segregated in the facility 1302.

The facility 1302 may include, or be coupled to, an inventory management system 1322. The inventory management system 1322 is configured to identify interactions with and between users 1316, devices such as sensors 1320, robots, material handling equipment, computing devices, and so forth, in one or more of the receiving area 1306, the storage area 1308, or the transition area 1310. These interactions may include one or more events 1324. For example, events 1324 may include the entry of the user 1316 to the facility 1302, stocking of items 1304 at an inventory location 1314, picking of an item 1304 from an inventory location 1314, returning of an item 1304 to an inventory location 1314, placement of an item 1304 within a tote 1318, movement of users 1316 relative to one another, gestures by the users 1316, and so forth. Other events 1324 involving users 1316 may include the user 1316 providing authentication information in the facility 1302, using a computing device at the facility 1302 to authenticate identity to the inventory management system 1322, and so forth. Some events 1324 may involve one or more other objects within the facility 1302. For example, the event 1324 may comprise movement within the facility 1302 of an inventory location 1314, such as a counter mounted on wheels. Events 1324 may involve one or more of the sensors 1320. For example, a change in operation of a sensor 1320, such as a sensor failure, change in alignment, and so forth, may be designated as an event 1324. Continuing the example, movement of a camera 1320(1) resulting in a change in the orientation of the field of view 1328 (such as resulting from someone or something bumping the camera 1320(1)) (e.g. camera) may be designated as an event 1324.

By determining the occurrence of one or more of the events 1324, the inventory management system 1322 may generate output data 1326. The output data 1326 comprises information about the event 1324. For example, where the event 1324 comprises an item 1304 being removed from an inventory location 1314, the output data 1326 may comprise an item identifier indicative of the particular item 1304 that was removed from the inventory location 1314 and a user identifier of a user that removed the item.

The inventory management system 1322 may use one or more automated systems to generate the output data 1326. For example, an artificial neural network, one or more classifiers, or other automated machine learning techniques may be used to process the sensor data from the one or more sensors 1320 to generate output data 1326. The automated systems may operate using probabilistic or non-probabilistic techniques. For example, the automated systems may use a Bayesian network. In another example, the automated systems may use support vector machines to generate the output data 1326 or the tentative results. The automated systems may generate confidence level data that provides information indicative of the accuracy or confidence that the output data 1326 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1304, user 1316, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1316 may pick an item 1304(1) such as a perfume bottle that is generally cubical in shape from the inventory location 1314. Other items 1304 at nearby inventory locations 1314 may be predominately spherical. Based on the difference in shape (cube vs. sphere) from the adjacent items, and the correspondence in shape with the previously stored image of the perfume bottle item 1304(1) (cubical and cubical), the confidence level that the user 606 has picked up the perfume bottle item 1304(1) is high.

In some situations, the automated techniques may be unable to generate output data 1326 with a confidence level above a threshold result. For example, the automated techniques may be unable to distinguish which user 1316 in a crowd of users 1316 has picked up the item 1304 from the inventory location 1314. In other situations, it may be desirable to provide human confirmation of the event 1324 or of the accuracy of the output data 1326. For example, some items 1304 may be deemed age restricted such that they are to be handled only by users 1316 above a minimum age threshold.

In instances where human confirmation is desired, sensor data associated with an event 1324 may be processed to generate inquiry data. The inquiry data may include a subset of the sensor data associated with the event 1324. The inquiry data may also include one or more of one or more tentative results as determined by the automated techniques, or supplemental data. The subset of the sensor data may be determined using information about the one or more sensors 1320. For example, camera data such as the location of the camera 1320(1) within the facility 1302, the orientation of the camera 1320(1), and a field of view 1328 of the camera 1320(1) may be used to determine if a particular location within the facility 1302 is within the field of view 1328. The subset of the sensor data may include images that may show the inventory location 1314 or that the item 1304 was stowed. The subset of the sensor data may also omit images from other cameras 1320(1) that did not have that inventory location 1314 in the field of view 1328. The field of view 1328 may comprise a portion of the scene in the facility 1302 that the sensor 1320 is able to generate sensor data about.

Continuing the example, the subset of the sensor data may comprise a video clip acquired by one or more cameras 1320(1) having a field of view 1328 that includes the item 1304. The tentative results may comprise the "best guess" as to which items 1304 may have been involved in the event 1324. For example, the tentative results may comprise results determined by the automated system that have a confidence level above a minimum threshold.

The facility 1302 may be configured to receive different kinds of items 1304 from various suppliers and to store them until a customer orders or retrieves one or more of the items 1304. A general flow of items 1304 through the facility 1302 is indicated by the arrows of FIG. 13. Specifically, as illustrated in this example, items 1304 may be received from one or more suppliers, such as manufacturers, distributors, wholesalers, and so forth, at the receiving area 1306. In various implementations, the items 1304 may include merchandise, commodities, perishables, or any suitable type of item 1304, depending on the nature of the enterprise that operates the facility 1302. The receiving of the items 1304 may comprise one or more events 1324 for which the inventory management system 1322 may generate output data 1326.

Upon being received from a supplier at receiving area 1306, the items 1304 may be prepared for storage. For example, items 1304 may be unpacked or otherwise rearranged. The inventory management system 1322 may include one or more software applications executing on a computer system to provide inventory management functions based on the events 1324 associated with the unpacking or rearrangement. These inventory management functions may include maintaining information indicative of the type, quantity, condition, cost, location, weight, or any other suitable parameters with respect to the items 1304. The items 1304 may be stocked, managed, or dispensed in terms of countable, individual units or multiples, such as packages, cartons, crates, pallets, or other suitable aggregations. Alternatively, some items 1304, such as bulk products, commodities, and so forth, may be stored in continuous or arbitrarily divisible amounts that may not be inherently organized into countable units. Such items 1304 may be managed in terms of measurable quantity such as units of length, area, volume, weight, time, duration, or other dimensional properties characterized by units of measurement. Generally speaking, a quantity of an item 1304 may refer to either a countable number of individual or aggregate units of an item 1304 or a measurable amount of an item 1304, as appropriate.

After arriving through the receiving area 1306, items 1304 may be stored within the storage area 1308. In some implementations, like items 1304 may be stored or displayed together in the inventory locations 1314 such as in bins, on shelves, hanging from pegboards, and so forth. In this implementation, all items 1304 of a given kind are stored in one inventory location 1314. In other implementations, like items 1304 may be stored in different inventory locations 1314. For example, to optimize retrieval of certain items 1304 having frequent turnover within a large physical facility 1302, those items 1304 may be stored in several different inventory locations 1314 to reduce congestion that might occur at a single inventory location 1314. Storage of the items 1304 and their respective inventory locations 1314 may comprise one or more events 1324.

When a customer order specifying one or more items 1304 is received, or as a user 1316 progresses through the facility 1302, the corresponding items 1304 may be selected or "picked" from the inventory locations 1314 containing those items 1304. In various implementations, item picking may range from manual to completely automated picking. For example, in one implementation, a user 1316 may have a list of items 1304 they desire and may progress through the facility 1302 picking items 1304 from inventory locations 1314 within the storage area 1308, and placing those items 1304 into a tote 1318. In other implementations, employees of the facility 1302 may pick items 1304 using written or electronic pick lists derived from customer orders. These picked items 1304 may be placed into the tote 1318 as the employee progresses through the facility 1302. Picking may comprise one or more events 1324, such as the user 1316 in moving to the inventory location 1314, retrieval of the item 1304 from the inventory location 1314, and so forth.

After items 1304 have been picked, they may be processed at a transition area 1310. The transition area 1310 may be any designated area within the facility 1302 where items 1304 are transitioned from one location to another or from one entity to another. For example, the transition area 1310 may be a packing station within the facility 1302. When the item 1304 arrives at the transition area 1310, the items 1304 may be transitioned from the storage area 1308 to the packing station. The transitioning may comprise one or more events 1324. Information about the transition may be maintained by the inventory management system 1322 using the output data 1326 associated with those events 1324.

In another example, if the items 1304 are departing the facility 1302 a list of the items 1304 may be obtained and used by the inventory management system 1322 to transition responsibility for, or custody of, the items 1304 from the facility 1302 to another entity. For example, a carrier may accept the items 1304 for transport with that carrier accepting responsibility for the items 1304 indicated in the list. In another example, a customer may purchase or rent the items 1304 and remove the items 1304 from the facility 1302. The purchase or rental may comprise one or more events 1324.

The inventory management system 1322 may access or generate sensor data about the facility 1302 and the contents therein including the items 1304, the users 1316, the totes 1318, and so forth. The sensor data may be acquired by one or more of the sensors 1320, data provided by other systems, and so forth. For example, the sensors 1320 may include cameras 1320(1) configured to acquire image data of scenes in the facility 1302. The image data may comprise still images, video, or a combination thereof. The image data may be processed by the inventory management system 1322 to determine a location of the user 1316, the tote 1318, the identity of the user 1316, and so forth. As used herein, the identity of the user may represent a unique identifier of the user (e.g., name, number associated with user, username, etc.), an identifier that distinguishes the user amongst other users being identified with the environment, or the like.

The inventory management system 1322, or systems coupled thereto, may be configured to identify the user 1316, as well as to determine other candidate users. In one implementation, this determination may comprise comparing sensor data with previously stored identity data. For example, the user 1316 may be identified by showing their face to a facial recognition system, by presenting a token carrying authentication credentials, providing a fingerprint, scanning a barcode or other type of unique identifier upon entering the facility, and so forth. Identity of the user 1316 may be determined before, during, or after entry to the facility 1302. Determination of the user's 1316 identity may comprise comparing sensor data associated with the user 1316 in the facility 1302 to previously stored user data.

In some instances, the inventory management system group users within the facility into respective sessions. That is, the inventory management system 1322 may utilize the sensor data to determine groups of users that are effectively "together" (e.g., shopping together). In some instances, a particular session may include multiple users that entered the facility 1302 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 1318. Noting the child and the mother as belonging to the same session may increase the chances of successfully adding the box of cereal to the virtual shopping cart of the mother.

By determining the occurrence of one or more events 1324 and the output data 1326 associated therewith, the inventory management system 1322 is able to provide one or more services to the users 1316 of the facility 1302. By utilizing one or more human associates to process inquiry data and generate response data that may then be used to produce output data 1326, overall accuracy of the system may be enhanced. The enhanced accuracy may improve the user experience of the one or more users 1316 of the facility 1302. In some examples, the output data 1326 may be transmitted over a network 1330 to one or more server(s) 608.

FIG. 14 illustrates a block diagram of the one or more server(s) 608. The server(s) 608 may be physically present at the facility 1402, may be accessible by the network 1430, or a combination of both. The server(s) 608 do not require end-user knowledge of the physical location and configuration of the system that delivers the services. Common expressions associated with the server(s) 608 may include "on-demand computing," "software as a service (SaaS)," "cloud services," "data centers," and so forth. Services provided by the server(s) 608 may be distributed across one or more physical or virtual devices.

The server(s) 608 may include one or more hardware processors 1402 (processors) configured to execute one or more stored instructions. The processors 1402 may comprise one or more cores. The server(s) 608 may include one or more input/output (I/O) interface(s) 1404 to allow the processor 1402 or other portions of the server(s) 608 to communicate with other devices. The I/O interfaces 1404 may comprise Inter-Integrated Circuit (I2C), Serial Peripheral Interface bus (SPI), Universal Serial Bus (USB) as promulgated by the USB Implementers Forum, and so forth.

The server(s) 608 may also include one or more communication interfaces 1406. The communication interfaces 1406 are configured to provide communications between the server(s) 608 and other devices, such as the sensors 1420, the interface devices, routers, and so forth. The communication interfaces 1406 may include devices configured to couple to personal area networks (PANs), wired and wireless local area networks (LANs), wired and wireless wide area networks (WANs), and so forth. For example, the communication interfaces 1406 may include devices compatible with Ethernet, Wi-Fi™, and so forth. The server(s) 608 may also include one or more busses or other internal communications hardware or software that allow for the transfer of data between the various modules and components of the server(s) 608.

The server(s) 608 may also include a power supply 1440. The power supply 1440 is configured to provide electrical power suitable for operating the components in the server(s) 608.

As shown in FIG. 14, the server(s) 608 includes one or more memories 1410. The memory 1410 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1410 provides storage of computer-readable instructions, data structures, program modules, and other data for the operation of the server(s) 608. A few example functional modules are shown stored in the memory 1410, although the same functionality may alternatively be implemented in hardware, firmware, or as a system on a chip (SOC).

The memory 1410 may include at least one operating system (OS) component 1412. The OS component 1412 is configured to manage hardware resource devices such as the I/O interface(s) 1404, the communication interface(s) 1408, and provide various services to applications or components executing on the processor(s) 1402. The OS component 1412 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 1410. These components may be executed as foreground applications, background tasks, daemons, and so forth. A communication component 1414 may be configured to establish communications with one or more of the sensors 1220, one or more user-recognition devices 104, one or more of the devices used by associates, other server(s) 608, or other devices. The communications may be authenticated, encrypted, and so forth.

The memory 1410 may store an inventory management system 1416. The inventory management system 1416 is configured to provide the inventory functions as described herein with regard to the inventory management system 1322. For example, the inventory management system 1416 may determine movement of items 1304 in the facility 1202, generate user interface data, and so forth.

The inventory management system 1416 may access information stored in one or more data stores 1418 in the memory 1410. The data store 1418 may use a flat file, database, linked list, tree, executable code, script, or other data structure to store the information. In some implementations, the data store 1418 or a portion of the data store 1418 may be distributed across one or more other devices including other server(s) 608, network attached storage devices, and so forth.

The data store 1418 may include physical layout data 1420. The physical layout data 1420 provides a mapping of physical locations within the physical layout of devices and objects such as the sensors 1320, inventory locations 1314, and so forth. The physical layout data 1420 may indicate the coordinates within the facility 1302 of an inventory location 1314, sensors 1320 within view of that inventory location 1314, and so forth. For example, the physical layout data 1420 may include camera data comprising one or more of a location within the facility 1302 of a camera 1320(1), orientation of the camera 1320(1), the operational status, and so forth. Continuing example, the physical layout data 1420 may indicate the coordinates of the camera 1320(1), pan and tilt information indicative of a direction that the field of view 1328 is oriented along, whether the camera 1320(1) is operating or malfunctioning, and so forth.

In some implementations, the inventory management system 1416 may access the physical layout data 1420 to determine if a location associated with the event 1324 is within the field of view 1328 of one or more sensors 1320. Continuing the example above, given the location within the facility 1302 of the event 1324 and the camera data, the inventory management system 1416 may determine the cameras 1320(1) that may have generated images of the event 1324.

The item data 1422 comprises information associated with the items 1304. The information may include information indicative of one or more inventory locations 1314 at which one or more of the items 1304 are stored. The item data 1422 may also include order data, SKU or other product identifier, price, quantity on hand, weight, expiration date, images of the item 1304, detail description information, ratings, ranking, and so forth. The inventory management system 1416 may store information associated with inventory management functions in the item data 1422.

The data store 1418 may also include sensor data 1424. The sensor data 1424 comprises information acquired from, or based on, the one or more sensors 1320. For example, the sensor data 1424 may comprise 3D information about an object in the facility 1302. As described above, the sensors 1320 may include a camera 1320(1), which is configured to acquire one or more images. These images may be stored as the image data 1426. The image data 1426 may comprise information descriptive of a plurality of picture elements or pixels. Non-image data 1428 may comprise information from other sensors 1320, such as input from the microphones 1320, weight sensors 1320, and so forth.

User data 1430 may also be stored in the data store 1418. The user data 1430 may include identity data, information indicative of a profile, purchase history, location data, images of the user 1316, demographic data, and so forth. Individual users 1316 or groups of users 1316 may selectively provide user data 1430 for use by the inventory management system 1322. The individual users 1316 or groups of users 1316 may also authorize collection of the user data 1430 during use of the facility 1302 or access to user data 1430 obtained from other systems. For example, the user 1316 may opt-in to collection of the user data 1430 to receive enhanced services while using the facility 1302.

In some implementations, the user data 1430 may include information designating a user 1316 for special handling. For example, the user data 1430 may indicate that a particular user 1316 has been associated with an increased number of errors with respect to output data 1326. The inventory management system 1416 may be configured to use this information to apply additional scrutiny to the events 1324 associated with this user 1316. For example, events 1324 that include an item 1304 having a cost or result above the threshold amount may be provided to the associates for processing regardless of the determined level of confidence in the output data 1326 as generated by the automated system.

The inventory management system 1416 may include one or more of a locating component 1432, identification component 1434, event determination component 1436, and inquiry component 1438.

The locating component 1432 functions to locate items or users within the environment of the facility to allow the inventory management system 1416 to assign certain events to the correct users. That is, the locating component 1432 may assign unique identifiers to users as they enter the facility and, with the users' consent, may locating the position of the users throughout the facility 1302 over the time they remain in the facility 1302. The locating component 1432 may perform this locating using sensor data 1424, such as the image data 1426. For example, the locating component 1432 may receive the image data 1426 and may use facial-recognition techniques to identify users from the images. After identifying a particular user within the facility, the locating component 1432 may then locating the user within the images as the user moves throughout the facility 1302. Further, should the locating component 1432 temporarily "lose" a particular user, the locating component 1432 may again attempt to identify the users within the facility based on facial recognition, and/or using other techniques such as voice recognition, or the like.

Therefore, upon receiving the indication of the time and location of the event in question, the locating component 1432 may query the data store 1418 to determine which one or more users were at or within a threshold distance of the location of the event at the particular time of the event. Further, the locating component 1432 may assign different confidence levels to different users, with the confidence levels indicating how likely it is that each corresponding user is the user that is in fact associated with the event of interest.

The locating component 1432 may access the sensor data 1424 in order to determine this location data of the user and/or items. The location data provides information indicative of a location of an object, such as the item 1304, the user 1316, the tote 1318, and so forth. The location may be absolute with respect to the facility 1302 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1302, 5.2 m from an inventory location 1314 along a heading of 169°, and so forth. For example, the location data may indicate that the user 1316(1) is 25.2 m along the aisle 1312(1) and standing in front of the inventory location 1314. In comparison, a relative location may indicate that the user 1316(1) is 32 cm from the tote 1318 at a heading of 73° with respect to the tote 1318. The location data may include orientation information, such as which direction the user 1316 is facing. The orientation may be determined by the relative direction the user's 1316 body is facing. In some implementations, the orientation may be relative to the interface device. Continuing the example, the location data may indicate that the user 1316(1) is oriented with a heading of 0°, or looking north. In another example, the location data may indicate that the user 1316 is facing towards the interface device.

The identification component 1434 is configured to identify an object. In one implementation, the identification component 1434 may be configured to identify an item 1304. In another implementation, the identification component 1434 may be configured to identify the user 1316. For example, the identification component 1434 may use facial recognition techniques to process the image data 1426 and determine the identity data of the user 1316 depicted in the images by comparing the characteristics in the image data 1426 with previously stored results. The identification component 1434 may also access data from other sensors 1320, such as from an RFID reader 1320, an RF receiver 1320, fingerprint sensors, and so forth.

The event determination component 1436 is configured to process the sensor data 1424 and generate output data 1326. The event determination component 1436 may access information stored in the data store 1418 including, but not limited to, event description data 1442, confidence levels 1444, or threshold values 1446.

The event description data 1442 comprises information indicative of one or more events 1324. For example, the event description data 1442 may comprise predefined profiles that designate movement of an item 1304 from an inventory location 1314 with the event 1324 of "pick". The event description data 1442 may be manually generated or automatically generated. The event description data 1442 may include data indicative of triggers associated with events occurring in the facility 1302. An event may be determined as occurring upon detection of the trigger. For example, sensor data 1424 such as a change in weight from a weight sensor 1320(6) at an inventory location 1314 may trigger detection of an event of an item 1304 being added or removed from the inventory location 1314. In another example, the trigger may comprise an image of the user 1316 reaching a hand toward the inventory location 1314. In yet another example, the trigger may comprise two or more users 1316 approaching to within a threshold distance of one another.

The event determination component 1436 may process the sensor data 1424 using one or more techniques including, but not limited to, artificial neural networks, classifiers, decision trees, support vector machines, Bayesian networks, and so forth. For example, the event determination component 1436 may use a decision tree to determine occurrence of the "pick" event 1324 based on sensor data 1424. The event determination component 1436 may further use the sensor data 1424 to determine one or more tentative results 1448. The one or more tentative results 1448 comprise data associated with the event 1324. For example, where the event 1324 comprises a disambiguation of users 1316, the tentative results 1448 may comprise a list of possible user identities. In another example, where the event 1324 comprises a disambiguation between items, the tentative results 1448 may comprise a list of possible item identifiers. In some implementations, the tentative result 1448 may indicate the possible action. For example, the action may comprise the user 1316 picking, placing, moving an item 1304, damaging an item 1304, providing gestural input, and so forth.

In some implementations, the tentative results 1448 may be generated by other components. For example, the tentative results 1448 such as one or more possible identities or locations of the user 1316 involved in the event 1324 may be generated by the locating component 1432. In another example, the tentative results 1448 such as possible items 1304 that may have been involved in the event 1324 may be generated by the identification component 1434.

The event determination component 1436 may be configured to provide a confidence level 1444 associated with the determination of the tentative results 1448. The confidence level 1444 provides indicia as to the expected level of accuracy of the tentative result 1448. For example, a low confidence level 1444 may indicate that the tentative result 1448 has a low probability of corresponding to the actual circumstances of the event 1324. In comparison, a high confidence level 1444 may indicate that the tentative result 1448 has a high probability of corresponding to the actual circumstances of the event 1324.

In some implementations, the tentative results 1448 having confidence levels 1444 that exceed the threshold result 1446 may be deemed to be sufficiently accurate and thus may be used as the output data 1326. For example, the event determination component 1436 may provide tentative results 1448 indicative of the three possible items 1304(1), 1304(2), and 1304(3) corresponding to the "pick" event 1324. The confidence levels 1444 associated with the possible items 1304(1), 1304(2), and 1304(3) may be 25%, 70%, 142%, respectively. Continuing the example, the threshold result may be set such that confidence level 1444 of 140% are deemed to be sufficiently accurate. As a result, the event determination component 1436 may designate the "pick" event 1324 as involving item 1304(3).

The inquiry component 1438 may be configured to use at least a portion of the sensor data 1424 associated with the event 1324 to generate inquiry data 1450. In some implementations, the inquiry data 1450 may include one or more of the tentative results 1448 or supplemental data 1452. The inquiry component 1438 may be configured to provide inquiry data 1450 to one or more devices associated with one or more human associates.

An associate user interface is presented on the respective devices of associates. The associate may generate response data 1454 by selecting a particular tentative result 1448, entering new information, indicating that they are unable to answer the inquiry, and so forth.

The supplemental data 1452 comprises information associated with the event 1224 or that may be useful in interpreting the sensor data 1424. For example, the supplemental data 1452 may comprise previously stored images of the items 1304. In another example, the supplemental data 1452 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1426 during presentation to an associate.

The inquiry component 1438 processes the response data 1454 provided by the one or more associates. The processing may include calculating one or more statistical results associated with the response data 1454. For example, statistical results may include a count of the number of times associates selected a particular tentative result 1448, determination of a percentage of the associates that selected a particular tentative result 1448, and so forth.

The inquiry component 1438 is configured to generate the output data 1326 based at least in part on the response data 1454. For example, given that a majority of the associates returned response data 1454 indicating that the item 1304 associated with the "pick" event 1324 is item 1304(5), the output data 1326 may indicate that the item 1304(5) was picked.

The inquiry component 1438 may be configured to selectively distribute inquiries to particular associates. For example, some associates may be better suited to answering particular types of inquiries. Performance data, such as statistical data about the performance of the associates, may be determined by the inquiry component 1438 from the response data 1454 provided by the associates. For example, information indicative of a percentage of different inquiries in which the particular associate selected response data 1454 that disagreed with the majority of associates may be maintained. In some implementations, test or practice inquiry data 1450 having a previously known correct answer may be provided to the associate for training or quality assurance purposes. The determination of the set of associates to use may be based at least in part on the performance data.

By using the inquiry component 1438, the event determination component 1436 may be able to provide high reliability output data 1326 that accurately represents the event 1324. The output data 1326 generated by the inquiry component 1438 from the response data 1454 may also be used to further train the automated systems used by the inventory management system 1416. For example, the sensor data 1424 and the output data 1326, based on response data 1454, may be provided to one or more of the components of the inventory management system 1416 for training in process improvement. Continuing the example, this information may be provided to an artificial neural network, Bayesian network, and so forth, to further train these systems such that the confidence level 1444 and the tentative results 1448 produced in the future for the same or similar input is improved.

In some instances, the server(s) 608 may further include one or more of the components illustrated in FIG. 9 with respect to the user-recognition device 104. In such instances, the server(s) 608 may perform one or more of the processes described herein with respect to the user-recognition device 104. Additionally, the server(s) 608 may send, to the user-recognition device 104, data (e.g., other data 662) associated with the performed processes. For instance, the data may indicate the locations of the portions of users when the users are using the user-recognition device 104.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device comprising:
   one or more distance sensors;
   one or more imaging devices;
   a display;
   one or more network interfaces;
   one or more processors; and
   one or more computer-readable media storing instructions that, when executed by the one or more processors, cause the one or more processors to perform operations comprising:
   detecting, at a first time and using the one or more distance sensors, a hand located over the electronic device;
   causing the display to present a first graphical element indicating a target vertical location and a target horizontal location for positioning the hand over the electronic device;
   generating, at a second time and using the one or more distance sensors, first distance data based on a first distance to the hand;
   determining, based at least in part on the first distance data, a first vertical location of the hand above the electronic device;
   generating, at a third time and using the one or more imaging devices, first image data representing the hand;
   analyzing first feature data corresponding to the first image data to determine one or more first attributes associated with the hand;
   determining, based at least in part on the one or more first attributes, a first horizontal location of the hand over the electronic device;
   determining the first vertical location is more than a first threshold distance to the target vertical location;
   determining that the first horizontal location is more than a second threshold distance to the target horizontal location;
   causing the display to present, along with the first graphical element, a second graphical element indicating the first vertical location and the first horizontal location;
   generating, at a fourth time and using the one or more distance sensors, second distance data based on a second distance to the hand;
   determining, based at least in part on the second distance data, a second vertical location of the hand above the electronic device;
   generating, at a fourth time and using the one or more imaging devices, second image data representing the hand;
   analyzing second feature data corresponding to the second image data to determine one or more second attributes associated with the hand;
   determining, based at least in part on the one or more second attributes, a second horizontal location of the hand over the electronic device;
   determining that the second vertical location is less than the first threshold distance to the target vertical location;
   determining that the second horizontal location is less than the second threshold distance to the target horizontal location; and
   authenticating a payment transaction by sending, using the one or more network interfaces, at least one of the second image data or the second feature data to a remote system.

2. The electronic device as recited in claim 1, the operations further comprising:
   determining a size for the second graphical element based at least in part on the first vertical location; and
   determining a position for the second graphical element on the display based at least in part on the first horizontal location,
   wherein causing the display to present the second graphical element comprises causing the display to present the second graphical element according to the size and the position.

3. The electronic device as recited in claim 1, wherein determining the first horizontal location of the hand comprises at least:
   determining, based at least in part on the one or more first attributes, one or more points located on the hand;
   determining a center of a palm of the hand based at least in part on the one or more points; and
   determining the first horizontal location using the center of the palm.

4. A method comprising:
   causing a display of an electronic device to present a first graphical element representing a target location relative to the electronic device;
   generating, by the electronic device, first sensor data representing a portion of a user;
   analyzing the first sensor data to determine a first vertical location of the portion of the user relative to the electronic device;
   determining that the first vertical location is more than a threshold distance from the target location;
   determining a first size of a second graphical element to be presented on the display along with the first graphical element based at least in part on the first vertical location;
   causing the display to present the second graphical element along with the first graphical element according to the first size of the second graphical element;
   generating, by the electronic device, second sensor data representing the portion of the user;
   analyzing the second sensor data to determine a second vertical location of the portion of the user relative to the electronic device;
   determining that the second vertical location is less than the threshold distance to the target location;
   determining a second size of the second graphical element to be presented on the display along with the first graphical element based at least in part on the second vertical location;

causing the display to present the second graphical element along with the first graphical element according to the second size of the second graphical element; and authenticating a payment transaction by sending at least one of the second sensor data or feature data to a remote system.

5. The method as recited in claim 4, further comprising:
determining a horizontal location of the portion of the user relative to the electronic device; and
determining a position of the second graphical element based at least in part on the horizontal location.

6. The method as recited in claim 4, further comprising:
determining a vertical difference between the first vertical location and the target location, wherein determining that the first vertical location is more than the threshold distance from the target location comprises determining that the vertical difference is more than the threshold distance.

7. The method as recited in claim 4, further comprising:
generating third sensor data representing the portion of the user;
analyzing feature data corresponding to the third sensor data to determine one or more points located on the portion of the user;
determining a center point associated with the portion of the user based at least in part on the one or more points; and
determining a horizontal location of the portion of the user relative to the electronic device based at least in part on the center point.

8. The method as recited in claim 4, wherein the first sensor data includes distance data representing a distance between the electronic device and the portion of the user, and wherein analyzing the first sensor data to determine the first vertical location of the portion of the user relative to the electronic device comprises at least analyzing the distance data to determine the distance, the first vertical location being associated with the distance.

9. The method as recited in claim 4, further comprising:
generating third sensor data representing the portion of the user;
analyzing the third sensor data to determine a third vertical location of the portion of the user relative to the electronic device;
determining that the third vertical location is more than the threshold distance to the target location;
determining at least one of an additional size or an additional position for the second graphical element based at least in part on the third vertical location; and
displaying, along with the first graphical element, the second graphical element according to the at least one of the additional size or the additional position.

10. The method as recited in claim 9, further comprising:
determining a position for the second graphical element based at least in part on a first horizontal location of the portion of the user relative to the electronic device; and
wherein:
determining the at least one of the additional size or the additional position for the second graphical element comprises at least:
determining the additional size for the second graphical element based at least in part on the third vertical location; and
determining the additional position for the second graphical element based at least in part on a second horizontal location of the portion of the user relative to the electronic device.

11. The method as recited in claim 4, further comprising:
displaying an instruction associated with placing the portion of the user over the electronic device;
generating third sensor data; and
detecting, based at least in part on the third sensor data, that the portion of the user is located over the electronic device,
wherein displaying the first graphical element occurs at least partially after detecting the portion of the user.

12. The method as recited in claim 4, further comprising displaying, along with the second graphical element, an instruction associated with moving the portion of the user to the target location within the environment.

13. The method as recited in claim 4, further comprising analyzing at least one of the second sensor data or third sensor data to determine at least one of:
a pose of the portion of the user;
a direction of the portion of the user; or
an orientation of the portion of the user.

14. The method as recited in claim 4, further comprising:
determining a position for the second graphical element based at least in part on a first horizontal location of the portion of the user relative to the electronic device.

15. An electronic device comprising:
one or more distance sensors;
one or more imaging devices;
a display;
one or more processors; and
one or more computer-readable media storing instructions that, when executed by the one or more processors, cause the one or more processors to perform operations comprising:
causing the display to present a first graphical element, the first graphical element representing a target location relative to the electronic device;
determining, using the one or more distance sensors, a vertical location of a portion of a user with respect to the electronic device;
generating, using the one or more imaging devices, image data representing the portion of the user;
analyzing feature data corresponding to the image data to determine a horizontal location of the portion of the user with respect to the electronic device;
causing the display to present a second graphical element along with the first graphical element, the second graphical element representative of the vertical location and the horizontal location;
generating, using the one or more imaging devices, additional image data representing the portion of the user;
analyzing additional feature data corresponding to the additional image data to determine an additional vertical location of the portion of the user relative to the electronic device;
determining that the additional vertical location is less than a threshold distance to the target location; and
authenticating a payment transaction by sending at least one of the second sensor data or feature data to a remote system.

16. The electronic device as recited in claim 15, the operations further comprising:
determining a size of the second graphical element based at least in part on the vertical location; and
determining a position for the second graphical element based at least in part on the horizontal location,
wherein causing the display to present the second graphical element comprises at least causing the display to present, along with the first graphical element, the second graphical element according to the size and the position.

17. The electronic device as recited in claim 15, the operations further comprising:
analyzing additional feature data corresponding to the additional image data to determine an additional horizontal location of the portion of the user with respect to the electronic device; and
causing the display to present, along with the first graphical element, the second graphical element indicating the additional vertical location and the additional horizontal location.

18. The electronic device as recited in claim 15, the operations further comprising:
analyzing additional feature data corresponding to the additional image data to determine an additional horizontal location of the portion of the user with respect to the electronic device;
determining that the additional vertical location is less than a first threshold distance to a target vertical location associated with the target location;
determining that the additional horizontal location is less than a second threshold distance to a target horizontal location associated with the target location; and
causing the display to indicate that an input was received.

19. The electronic device as recited in claim 15, the operations further comprising:
determining that at least one of the vertical location is more than of a first threshold distance to a target vertical location associated with the target location or the horizontal location is more than of a second threshold distance to a target horizontal location associated with the target location,
wherein at least one of:
a first size of the second graphical element is different than a second size of the first graphical element based at least in part on the vertical location being more than the first threshold distance to the target vertical location; or
at least a portion of the second graphical element is located more than of the first graphical element based at least in part on the horizontal location being more than the second threshold distance to the target horizontal location.

20. The electronic device as recited in claim 15, wherein:
the first graphical element includes a first shape;
the second graphical element includes a second shape that is similar to the first shape; and
at least one of:
a size of the first shape is different than a size of the second shape based at least in part on the vertical location being more than a first threshold distance to the target location; or
a position of the first shape is different than a position of the second shape based at least in part on the horizontal location being more than a second threshold distance to the target location.

\* \* \* \* \*